US012670741B2

(12) United States Patent
Zhang et al.

(10) Patent No.: US 12,670,741 B2
(45) Date of Patent: Jun. 30, 2026

(54) PALM CONTOUR EXTRACTION METHOD AND APPARATUS, AND CONTROL INSTRUCTION GENERATION METHOD AND APPARATUS

(71) Applicant: Tencent Technology (Shenzhen) Company Limited, Shenzhen (CN)

(72) Inventors: Zhiqiang Zhang, Shenzhen (CN); Runzeng Guo, Shenzhen (CN); Shaoming Wang, Shenzhen (CN); Xiaoyi Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 98 days.

(21) Appl. No.: 18/766,447

(22) Filed: Jul. 8, 2024

(65) Prior Publication Data

US 2024/0362948 A1 Oct. 31, 2024

Related U.S. Application Data

(63) Continuation of application No. PCT/CN2023/083956, filed on Mar. 27, 2023.

(30) Foreign Application Priority Data

May 27, 2022 (CN) .......................... 202210587233.0

(51) Int. Cl.
G06V 40/10 (2022.01)
G06F 3/01 (2006.01)
(Continued)

(52) U.S. Cl.
CPC ............... G06V 40/11 (2022.01); G06F 3/01 (2013.01); G06Q 20/40 (2013.01); G06T 13/80 (2013.01);
(Continued)

(58) Field of Classification Search
CPC ........ G06F 3/01; G06Q 20/40; G06V 10/443; G06V 10/457; G06V 10/46; G06V 40/11; Y02P 90/30
See application file for complete search history.

(56) References Cited

U.S. PATENT DOCUMENTS

2016/0373438 A1 12/2016 Yoon
2017/0277963 A1 9/2017 Matsunami
2018/0335843 A1 11/2018 Erivanteev et al.

FOREIGN PATENT DOCUMENTS

CN 104102340 A 10/2014
CN 112198962 A * 1/2021 ........... G06V 40/107
(Continued)

OTHER PUBLICATIONS

Tencent Technology, ISR, PCT/CN2023/083956, Jun. 16, 2023, 2 pgs.

(Continued)

*Primary Examiner* — Cory A Almeida
(74) *Attorney, Agent, or Firm* — Morgan, Lewis & Bockius LLP

(57) ABSTRACT

This application provides a palm contour extraction method performed by a computer device. The method includes: obtaining bone point information respectively corresponding to palm bone points in a target palm image, the bone point information including bone point positions and bone point types; matching the palm bone points based on the bone point positions and the bone point types, to obtain a plurality of palm bone point sets, each palm bone point set having a corresponding geometry processing type for a corresponding set of palm bone points in the target palm image; determining a plurality of palm contour points from the plurality of palm bone point sets based on their respective geometry processing type; and generating a palm con- (Continued)

tour corresponding to the target palm image based on the plurality of palm contour points.

20 Claims, 17 Drawing Sheets

(51) Int. Cl.

| | | |
|---|---|---|
| *G06Q 20/40* | (2012.01) | |
| *G06T 13/80* | (2011.01) | |
| *G06V 10/44* | (2022.01) | |
| *G06V 10/46* | (2022.01) | |

(52) U.S. Cl.
CPC .......... *G06V 10/443* (2022.01); *G06V 10/457* (2022.01); *G06V 10/46* (2022.01); *Y02P 90/30* (2015.11)

(56) References Cited

FOREIGN PATENT DOCUMENTS

| | | | |
|---|---|---|---|
| CN | 113238650 | A | 8/2021 |
| CN | 114095647 | A | 2/2022 |
| CN | 114299604 | A | 4/2022 |
| JP | 2013205931 | A | 10/2013 |

OTHER PUBLICATIONS

NetEase, Covered with Wrinkled Hands, Will you Draw? Tutorial Explanation, Please Collect it Quickly!! Apr. 2019, Retrieved from the Internet: https://www.163.com/dy/article/ED0EA2SG0514E1OL. html.

Tencent Technology, WO+IPRP, PCT/CN2023/083956, Nov. 7, 2024, 5 pgs.

Tencent Technology, Extended European Search Report, EP Patent Application No. 23810653.8, Jul. 25, 2025, 9 pgs.

\* cited by examiner

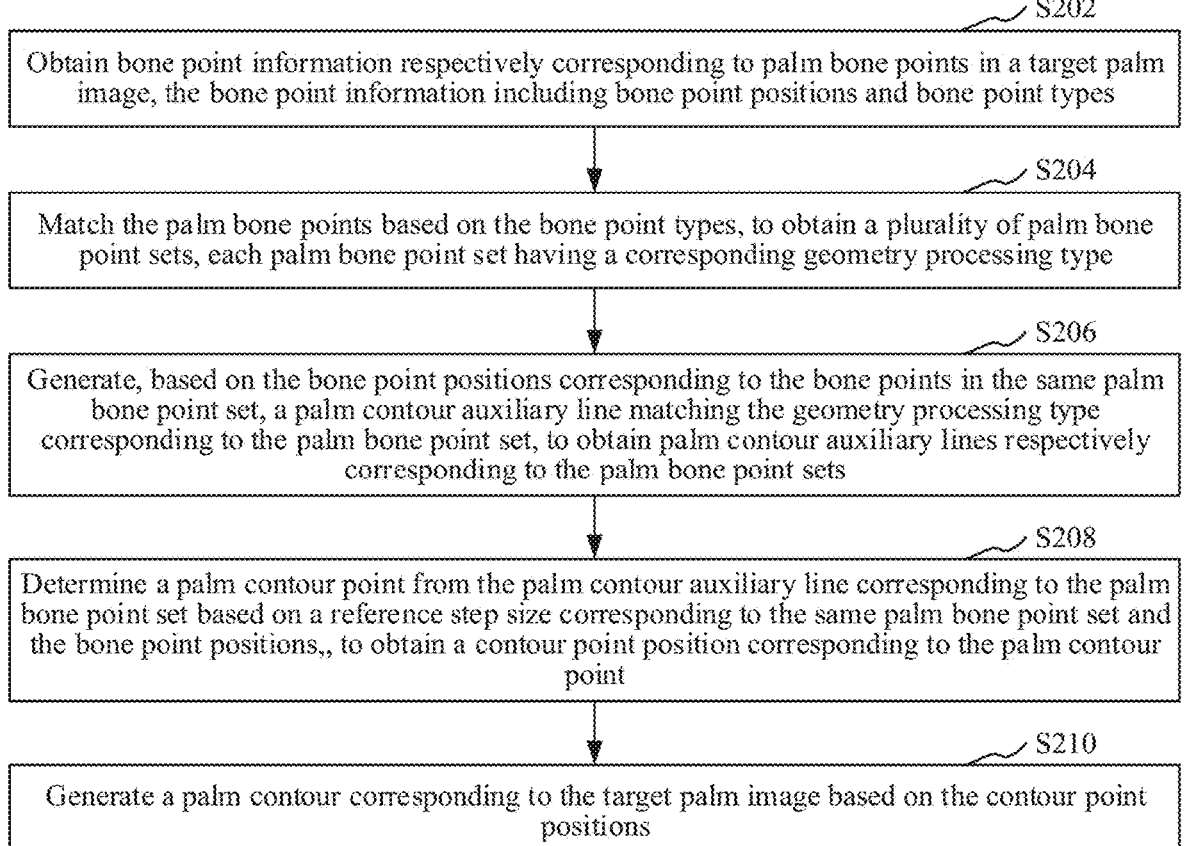

S202

Obtain bone point information respectively corresponding to palm bone points in a target palm image, the bone point information including bone point positions and bone point types

S204

Match the palm bone points based on the bone point types, to obtain a plurality of palm bone point sets, each palm bone point set having a corresponding geometry processing type

S206

Generate, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets

S208

Determine a palm contour point from the palm contour auxiliary line corresponding to the palm bone point set based on a reference step size corresponding to the same palm bone point set and the bone point positions,, to obtain a contour point position corresponding to the palm contour point

S210

Generate a palm contour corresponding to the target palm image based on the contour point positions

FIG. 2

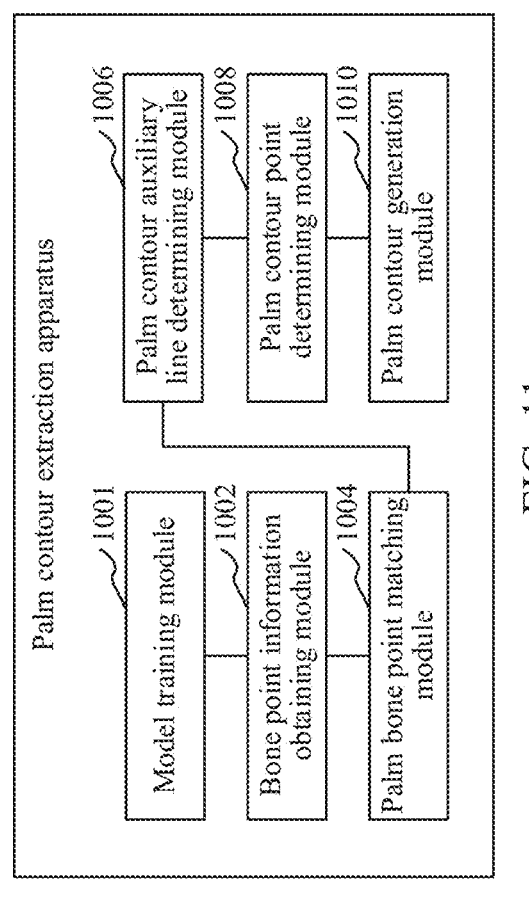

Palm contour extraction apparatus

1001 Model training module

1002 Bone point information obtaining module

1004 Palm bone point matching module

1006 Palm contour auxiliary line determining module

1008 Palm contour point determining module

1010 Palm contour generation module

FIG. 11

Control instruction generation apparatus

1202 Palm contour display module

1204 Control instruction generation module

FIG. 12

PALM CONTOUR EXTRACTION METHOD AND APPARATUS, AND CONTROL INSTRUCTION GENERATION METHOD AND APPARATUS

CROSS-REFERENCE TO RELATED APPLICATIONS

This application is a continuation application of PCT Patent Application No. PCT/CN2023/083956, entitled "VIRTUAL IDENTIFIER PROCESSING METHOD AND APPARATUS, STORAGE MEDIUM, AND ELECTRONIC DEVICE" filed on Mar. 27, 2023, which claims priority to Chinese Patent Application No. 202210587233.0, entitled "PALM CONTOUR EXTRACTION METHOD AND APPARATUS, CONTROL INSTRUCTION GENERATION METHOD AND APPARATUS, AND COMPUTER DEVICE" filed with the China National Intellectual Property Administration on May 27, 2022, both of which are incorporated herein by reference in their entirety.

FIELD OF THE TECHNOLOGY

This application relates to the field of computer technologies, and in particular, to a palm contour extraction method and apparatus, a control instruction generation method and apparatus, a computer device, a storage medium, and a computer program product.

BACKGROUND OF THE DISCLOSURE

With the development of computer technologies, a palm extraction technology emerges. The palm extraction technology includes technical content of recognizing a palm contour from a palm image.

In the related art, various data processing is usually performed on pixel information of the palm image to extract the palm contour in the palm image, for example, binary processing and edge detection are performed on the palm image to extract the palm contour. However, the palm contour extraction method based on the pixel information of the palm image is susceptible to interference from image backgrounds, causing it impossible to extract an accurate palm contour.

SUMMARY

Embodiments of this application provide a palm contour extraction method and apparatus, a control instruction generation method and apparatus, a computer device, a computer-readable storage medium, and a computer program product.

A palm contour extraction method is performed by a computer device, and the method includes:

obtaining bone point information respectively corresponding to palm bone points in a target palm image, the bone point information including bone point positions and bone point types;

matching the palm bone points based on the bone point positions and the bone point types, to obtain a plurality of palm bone point sets, each palm bone point set having a corresponding geometry processing type for a corresponding set of palm bone points in the target palm image determining a plurality of palm contour points from the plurality of palm bone point sets based on their respective geometry processing type; and generating a palm contour corresponding to the target palm image based on the plurality of palm contour points.

A computer device includes a memory and one or more processors, the memory having computer-readable instructions stored therein, and the computer-readable instructions, when executed by the one or more processors, causing the computer device to perform the operations of the palm contour extraction method.

A non-transitory computer-readable storage medium has computer-readable instructions stored therein, the computer-readable instructions, when executed by one or more processors of a computer device, causing the computer device to perform the operations of the palm contour extraction method.

The details of one or more embodiments of this application are disclosed in the following accompanying drawings and description. Other features, objectives and advantages of this application will become clear from the specification, accompanying drawings and claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 2 is a schematic flowchart of a palm contour extraction method according to an embodiment.

FIG. 11 is a structural block diagram of a palm contour extraction apparatus according to another embodiment.

FIG. 12 is a structural block diagram of a control instruction generation apparatus according to an embodiment.

DESCRIPTION OF EMBODIMENTS

To make the objectives, technical solutions, and advantages of this application clearer and more comprehensible, this application is further described below in detail with reference to the accompanying drawings and embodiments. The specific embodiments described herein are merely for explaining this application, but are not intended to limit this application.

Figure 1:
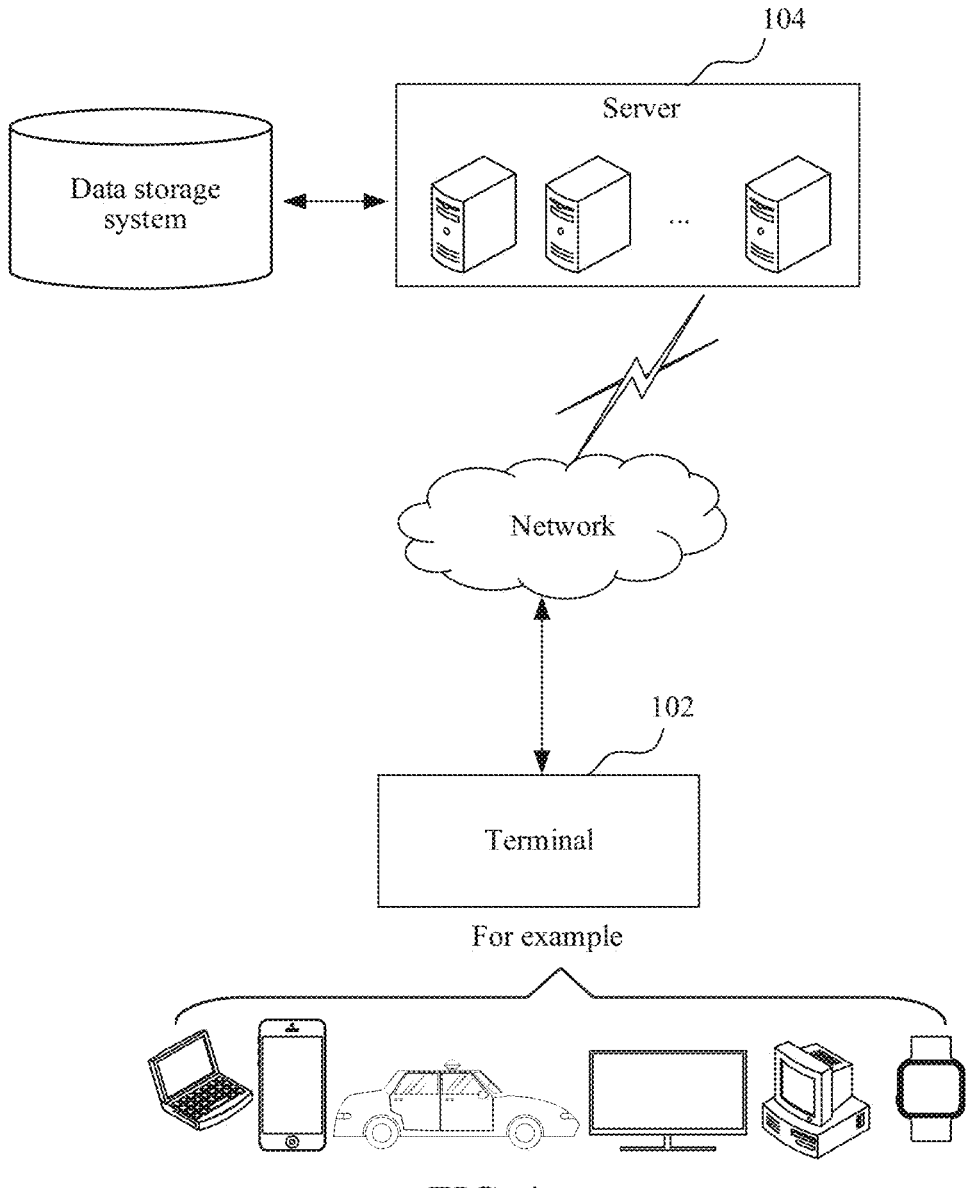
FIG. 1 is a diagram of an application environment of a palm contour extraction method and a control instruction generation method according to an embodiment.

A palm contour extraction method and a control instruction generation method provided in the embodiments of this application may be applied to an application environment shown in FIG. 1. A terminal 102 communicates with a server 104 via a network. A data storage system may store data that the server 104 needs to process. The data storage system may be integrated on the server 104, or placed on a cloud or another server. The terminal 102 may be, but not limited to, a desktop computer, a notebook computer, a smartphone, a tablet computer, an Internet of Things device, and a portable wearable device. The Internet of Things device may be a smart speaker, a smart television, a smart air conditioner, a smart in-vehicle device, or the like. The portable wearable device may be a smart watch, a smart band, a head-mounted device, or the like. The server 104 may be implemented as an independent server or as a server cluster including a plurality of servers or as a cloud server.

Both a terminal and a server may be configured to separately perform the palm contour extraction method and the control instruction generation method provided in the embodiments of this application.

For example, a terminal obtains bone point information respectively corresponding to palm bone points in a target palm image, the bone point information including bone point positions and bone point types, and matches the palm bone points based on the bone point types, to obtain a plurality of palm bone point sets, each palm bone point set having a corresponding geometry processing type. The terminal generates, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets, and determines a palm contour point from the palm contour auxiliary line corresponding to the palm bone point set based on a reference step size corresponding to the same palm bone point set and the bone point positions, to obtain a contour point position corresponding to the palm contour point. The terminal generates a palm contour corresponding to the target palm image based on the contour point positions.

The terminal displays the palm contour determined based on the target palm image, and generates an object control instruction based on display information of the palm contour.

The terminal and the server may also be configured to collaboratively perform the palm contour extraction method and the control instruction generation method provided in the embodiments of this application.

For example, a server obtains, from a terminal, bone point information respectively corresponding to palm bone points in a target palm image, the bone point information including bone point positions and bone point types, and matches the palm bone points based on the bone point types, to obtain a plurality of palm bone point sets, each palm bone point set having a corresponding geometry processing type. The server generates, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets, and determines a palm contour point from the palm contour auxiliary line corresponding to the palm bone point set based on a reference step size corresponding to the same palm bone point set and the bone point positions, to obtain a contour point position corresponding to the palm contour point. The server generates a palm contour corresponding to the target palm image based on the contour point positions.

The terminal obtains the palm contour determined based on the target palm image from the server, displays the palm contour, and generates an object control instruction based on display information of the palm contour.

In the foregoing palm contour extraction method, there is no need to perform complex data processing on pixel information of the palm image, and geometry processing is performed based on the bone point information corresponding to the palm bone points in the palm image, so that the contour point positions corresponding to the palm contour points can be conveniently determined from the palm image, to generate the palm contour based on the contour point positions corresponding to the palm contour points. Positions and types of the palm bone points are not susceptible to interference from image backgrounds. Extracting the palm contour based on the positions and the types of the palm bone points in the palm image can effectively improve extraction accuracy of the palm contour.

In the foregoing control instruction generation method, the contour point positions corresponding to the palm contour points are determined by performing geometry processing based on the bone point information corresponding to the palm bone points in the palm image, and the palm contour is generated based on the contour point positions corresponding to the palm contour points. The palm contour is extracted without the need to perform complex data processing on pixel information of the palm image, and has high extraction accuracy for being not susceptible to interference from image backgrounds. Extracting an accurate palm contour is also helpful to ensure accurate display, and further helpful to improve generation accuracy of the object control instruction. The object control instruction is automatically generated based on the display information of the palm contour, which can also improve the generation efficiency of the object control instruction.

In an embodiment, as shown in FIG. 2, a palm contour extraction method is provided. An example in which the method is applied to a computer device is used for description. The computer device may be the terminal 102 or the server 104 in FIG. 1. Referring to FIG. 2, the palm contour extraction method includes the following operations.

S202: Obtain bone point information respectively corresponding to palm bone points in a target palm image, the bone point information including bone point positions and bone point types.

The target palm image is a palm image from which a palm contour is to be extracted. The palm image is an image including a palm. The palm image may include only a palm. For example, the palm image is an image obtained by capturing a palm region. The palm image may also include more body parts. For example, the palm image is obtained by capturing a half body of an object with a palm raised. The palm image may be captured in real time. For example, a palm photo captured in real time is used as the palm image; and a video frame including a palm in a video captured in real time is used as the palm image. The palm image may also be obtained from pre-captured data. For example, a palm photo stored in a photo album is used as the palm image; and a video frame including a palm in a pre-edited video is used as the palm image. In addition, the palm image may be obtained by capturing a real palm, or may be obtained by capturing a virtual palm.

The palm bone point is a bone point in a palm. The palm includes a plurality of palm bone points. Palm bone point recognition is performed on the palm image, to obtain bone point information respectively corresponding to the palm bone points in the palm image. The bone point information includes bone point positions and bone point types. The bone point positions are configured for identifying positions of the palm bone points in the palm image, and the bone point types are configured for identifying types of the palm bone points.

Specifically, the computer device may obtain the target palm image locally or from another device, and perform palm bone point recognition on the target palm image in real time to obtain the bone point information respectively corresponding to the palm bone points in the target palm image, or may directly obtain pre-recognized bone point information respectively corresponding to the palm bone points in the target palm image locally or from another device. Further, the computer device may perform palm contour recognition on the target palm image based on the bone point information respectively corresponding to the palm bone points, to obtain the palm contour in the target palm image.

S204: Match the palm bone points based on the bone point types, to obtain a plurality of palm bone point sets, each palm bone point set having a corresponding geometry processing type.

The palm bone point set includes at least two palm bone points. Each palm bone point set has a corresponding geometry processing type. The geometry processing type is configured for determining a geometry processing manner corresponding to the palm bone point set. Geometry processing is performed on the palm bone point set in the geometry processing manner corresponding to the palm bone point set, to obtain palm contour points corresponding to the palm bone point set. The same palm bone point set may correspond to at least one geometry processing type.

Specifically, the computer device may match the palm bone points based on the bone point types, form successfully matched palm bone points into a palm bone point set, and finally obtain a plurality of palm bone point sets. Each palm bone point set has a corresponding geometry processing type.

In an embodiment, the computer device may obtain bone point type matching information. The bone point type matching information records matching relationships between the bone point types. Based on the bone point type matching information, the computer device may quickly match the palm bone points based on the bone point types, to quickly obtain palm bone point sets. In an embodiment, the bone point type matching information may further include geometry processing types respectively corresponding to the matching relationships, so that when the palm bone point set is determined based on the matching relationship, the geometry processing type corresponding to the palm bone point set may be synchronously determined.

In an embodiment, the geometry processing type corresponding to the palm bone point set may be determined based on the bone point types corresponding to the palm bone points in the palm bone point set. For example, at least one target palm bone point type corresponding to each geometry processing type is preset. If the palm bone point set includes a target palm bone type, the geometry processing type corresponding to the target palm bone point type is used as the geometry processing type corresponding to the palm bone point set.

In an embodiment, the geometry processing type corresponding to the palm bone point set may be determined based on the bone point positions corresponding to the palm bone points in the palm bone point set. For example, a palm part in the palm image is divided into a plurality of palm regions, each palm region has a corresponding geometry processing type, and a geometry processing type corresponding to the palm region into which the palm bone point set falls is used as the geometry processing type corresponding to the palm bone point set.

In an embodiment, there are connection relationships between the palm bone points. When the palm bone points are recognized, the connection relationships between the palm bone points and the bone point information of the palm bone points may be synchronously recognized. The computer device may first perform preliminary matching on the palm bone points based on the connection relationships to obtain a plurality of first palm bone point sets, then perform complementary matching on the palm bone points based on the bone point types to obtain a plurality of second palm bone point sets, and finally obtain the palm bone point set based on the first palm bone point sets and the second palm bone point sets.

Figure 3:
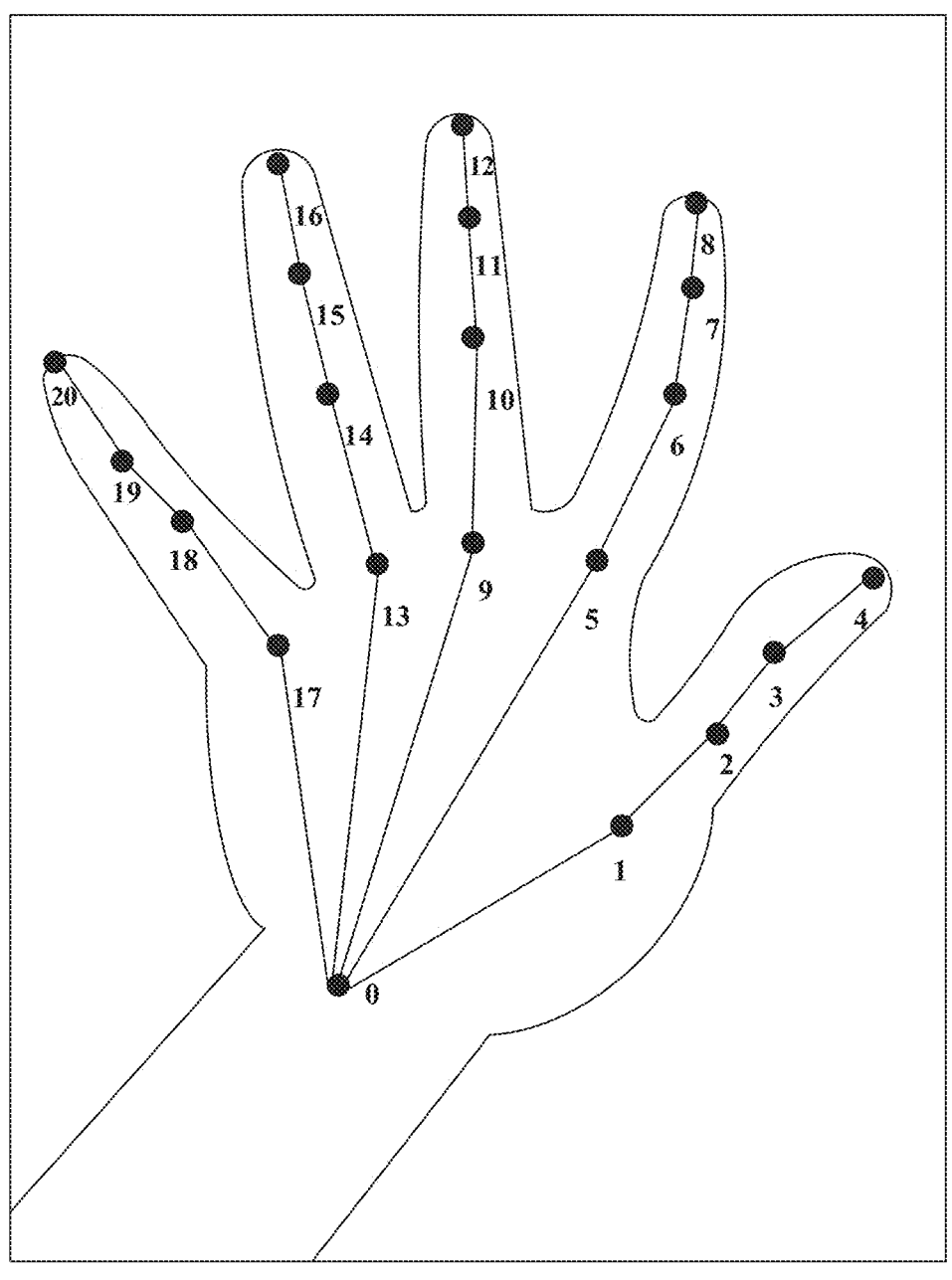
FIG. 3 is a schematic diagram of palm bone points according to an embodiment.

For example, referring to FIG. 3, dots in FIG. 3 represent palm bone points, including a total of 21 palm bone points, and connection lines between the dots in FIG. 3 represent the connection relationships between the palm bone points. The computer device may form adjacent palm bone points having the connection relationship into a first palm bone point set. For example, dot 0 and dot 1 are formed into a first palm bone point set, and dot 1 and dot 2 are formed into a first palm bone point set. The computer device may form the palm bone points corresponding to a preset bone point type into a second palm bone point set. For example, if the bone point type corresponding to dot 13 and dot 17 is the preset bone point type, dot 13 and dot 17 may be formed into a second palm bone point set.

S206: Generate, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets.

The palm contour auxiliary line is a geometric line configured for determining the palm contour point.

Specifically, after palm bone point sets are determined, for any palm bone point set, the computer device may generate, based on the bone point positions corresponding to the bone points in the palm bone point set, the palm contour auxiliary line matching the geometry processing type corresponding to the palm bone point set. The computer device may determine a geometry processing manner and a geometry processing algorithm based on the geometry processing type corresponding to the palm bone point set, and perform data processing on the bone point positions corresponding to the bone points in the palm bone point set through the geometry processing algorithm, to generate the palm contour auxiliary line corresponding to the palm bone point set. Finally, the computer device may obtain the palm contour auxiliary lines respectively corresponding to the palm bone point sets.

One palm bone point set may correspond to at least one palm contour auxiliary line.

S208: Determine a palm contour point from the palm contour auxiliary line corresponding to the palm bone point set based on a reference step size corresponding to the same palm bone point set and the bone point positions, to obtain a contour point position corresponding to the palm contour point.

The reference step size is a movement step size on the palm contour auxiliary line. Each palm bone point set has a corresponding reference step size. The contour point position is configured for identifying a position of the palm contour point.

Specifically, for any palm bone point set, the computer device may determine a palm contour point from the palm contour auxiliary line corresponding to the palm bone point set based on the bone point positions corresponding to the palm bone points in the palm bone point set and the reference step size corresponding to the palm bone point set, to obtain the contour point position corresponding to the palm contour point. The computer device may determine a movement start point from the palm contour auxiliary line corresponding to the palm bone point set based on the bone point positions corresponding to the palm bone points in the palm bone point set, start to move the reference step size from the movement start point on the palm contour auxiliary line corresponding to the palm bone point set, and use a movement end point obtained by moving the reference step size as the palm contour point. Finally, the computer device may obtain a plurality of palm contour points and contour point positions respectively corresponding to the palm contour points.

In an embodiment, a palm image with a marked palm contour may be obtained as a reference palm image, and a general reference step size is determined based on the reference palm image. Specifically, a palm contour auxiliary line corresponding to the reference palm image is determined based on the reference palm image, and an intersection point between the palm contour auxiliary line and the marked palm contour is used as a reference contour point. The reference contour point is an accurate palm contour point, an accurate movement step size is determined based on a distance between the movement start point and the reference contour point, and the accurate movement step size is used as the reference step size. The computer device may obtain a plurality of reference palm images, and count the same type of reference step sizes determined based on different reference palm images to obtain the general reference step size. For example, an average value of the reference step sizes may be calculated as the general reference step size. Subsequently, when a palm image of an unknown palm contour is processed, the general reference step size may be directly obtained to determine the palm contour point in the palm image, or the general reference step size may be fine-tuned based on personalization information of the palm image to obtain a target reference step size, and the palm contour point in the palm image is determined based on the target reference step size. The personalization information of the palm image includes at least one type of data of palm size information and palm depth information.

In an embodiment, the reference step size increases as the palm size information corresponding to the target palm image increases. The palm size information is configured for representing a size of the palm in the target palm image. For a larger palm, more reference step sizes need to be moved on the palm contour auxiliary line to reach the accurate palm contour point. In an embodiment, the palm size information includes at least one of palm length information or palm width information.

In an embodiment, the reference step size increases as the palm depth information corresponding to the target palm image decreases. The palm depth information is configured for representing a distance between the palm and an image collection device. When the distance is shorter, the palm depth information is smaller, and when the distance is farther, the palm depth information is larger. Smaller palm depth information corresponding to the target palm image leads to a smaller distance between the palm and the image collection device and a larger palm region presented in the target palm image. For a larger palm region, more reference step sizes need to be moved on the palm contour auxiliary line to reach the accurate palm contour point. In an embodiment, the target palm image may be a depth map, and each pixel value of the depth map represents a distance between a point in a scene and the image collection device.

S210: Generate a palm contour corresponding to the target palm image based on the contour point positions.

Specifically, after determining the contour point positions respectively corresponding to the palm contour points, the computer device may connect the contour point positions, to obtain the palm contour corresponding to the target palm image.

In the foregoing palm contour extraction method, bone point information respectively corresponding to palm bone points in a target palm image is obtained, the bone point information including bone point positions and bone point types; the palm bone points are matched based on the bone point types, to obtain a plurality of palm bone point sets, each palm bone point set having a corresponding geometry processing type; based on the bone point positions corresponding to the bone points in the same palm bone point set, a palm contour auxiliary line matching the geometry processing type corresponding to the palm bone point set is generated to obtain palm contour auxiliary lines respectively corresponding to the palm bone point sets; a palm contour point is determined from the palm contour auxiliary line corresponding to the palm bone point set based on a reference step size corresponding to the same palm bone point set and the bone point positions, to obtain a contour point position corresponding to the palm contour point; and a palm contour corresponding to the target palm image is generated based on the contour point positions. In this way, there is no need to perform complex data processing on pixel information of the palm image, and geometry processing is performed based on the bone point information corresponding to the palm bone points in the palm image, so that the contour point positions corresponding to the palm contour points can be conveniently determined from the palm image, to generate the palm contour based on the contour point positions corresponding to the palm contour points. Positions and types of the palm bone points are not susceptible to interference from image backgrounds. Extracting the palm contour based on the positions and the types of the palm bone points in the palm image can effectively improve extraction accuracy of the palm contour.

In an embodiment, the bone point type is determined by a finger parameter and an intra-finger joint parameter. The matching the palm bone points based on the bone point types, to obtain a plurality of palm bone point sets includes:
establishing a matching relationship between adjacent palm bone points whose intra-finger joint parameter is a preset joint parameter, to obtain palm bone point sets corresponding to a first geometry processing type; establishing a matching relationship between adjacent palm bone points corresponding to the same finger parameter, to obtain palm bone point sets corresponding to a second geometry processing type; and using a palm bone point corresponding to a preset bone point type as a preset bone point, and establishing a matching relationship between the preset bone point and a palm bone point closest to the preset bone point, to obtain a palm bone point set corresponding to a third geometry processing type.

The bone point type is determined by a finger parameter and an intra-finger joint parameter. The finger parameter is configured for representing a finger to which the palm bone point belongs. The palm bone points on different fingers may be distinguished based on the finger parameter. The intra-finger joint parameter is configured for representing a joint to which the palm bone point belongs in a finger. Different palm bone points on the same finger may be distinguished based on the intra-finger joint parameter.

The preset joint parameter is a preset specific intra-finger joint parameter. The preset bone point type is a preset specific bone point type. The preset joint parameter and the preset bone point type may be set according to actual requirements. The adjacent palm bone points are two palm bone points adjacent in position.

Specifically, when matching the palm bone points, the computer device may obtain adjacent palm bone points with the intra-finger joint parameter being the preset joint parameter from the palm bone points, and establish a matching relationship between the adjacent palm bone points with the intra-finger joint parameter being the preset joint parameter, thereby obtaining the palm bone point sets corresponding to the first geometry processing type. For example, referring to FIG. 3, intra-finger joint parameters corresponding to dot 13, dot 17, dot 9, and dot 5 are metacarpodigital joints, that is, dot 13, dot 17, dot 9, and dot 5 are metacarpodigital joints corresponding to different fingers. If the preset joint parameter is the metacarpodigital joint, a matching relationship is established between the adjacent dot 13 and dot 17, to obtain a palm bone point set A1 corresponding to the first geometry processing type, a matching relationship is established between the adjacent dot 13 and dot 9, to obtain a palm bone point set A2 corresponding to the first geometry processing type, and a matching relationship is established between the adjacent dot 9 and dot 5, to obtain a palm bone point set A3 corresponding to the first geometry processing type.

When matching the palm bone points, the computer device may obtain adjacent palm bone points with the same finger parameter from the palm bone points, and establish a matching relationship between the adjacent palm bone points corresponding to the same finger parameter, thereby obtaining the palm bone point sets corresponding to the second geometry processing type. For example, referring to FIG. 3, the finger parameter corresponding to dot 1, dot 2, dot 3, and dot 4 is the thumb, that is, dot 1, dot 2, dot 3, and dot 4 are different joints on the same finger, a matching relationship is established between the adjacent dot 1 and dot 2, to obtain a palm bone point set B1 corresponding to the second geometry processing type, a matching relationship is established between the adjacent dot 2 and dot 3, to obtain a palm bone point set B2 corresponding to the second geometry processing type, and a matching relationship is established between the adjacent dot 3 and dot 4, to obtain a palm bone point set B3 corresponding to the second geometry processing type.

When matching the palm bone points, the computer device may obtain a palm bone point corresponding to the preset bone point type from the palm bone points as the preset bone point, obtain a palm bone point closest to the preset bone point, and establish a matching relationship between the preset bone point and the palm bone point closest to the preset bone point, thereby obtaining the palm bone point set corresponding to the third geometry processing type. For example, referring to FIG. 3, if the bone point type corresponding to dot 0 is the preset bone point type, dot 0 is the preset bone point, dot 1 is the palm bone point closest to dot 0, and a matching relationship is established between dot 0 and dot 1, to obtain a palm bone point set C corresponding to the third geometry processing type.

In the foregoing embodiment, the matching relationship is established between adjacent palm bone points whose intra-finger joint parameter is the preset joint parameter, to obtain the palm bone point sets corresponding to the first geometry processing type; the matching relationship is established between adjacent palm bone points corresponding to the same finger parameter, to obtain the palm bone point sets corresponding to the second geometry processing type; and the palm bone point corresponding to the preset bone point type is used as the preset bone point, and the matching relationship is established between the preset bone point and the palm bone point closest to the preset bone point, to obtain the palm bone point set corresponding to the third geometry processing type. The bone point type is determined by the finger parameter and the intra-finger joint parameter, and the matching relationship may be quickly established through the finger parameter, the intra-finger joint parameter, and the bone point type, thereby quickly obtaining the palm bone point sets.

In an embodiment, the first geometry processing type is configured for determining palm contour points on an inter-digit and a palm outer contour. The second geometry processing type is configured for determining a palm contour point on a finger contour edge. The third geometry processing type is configured for determining palm contour points on the finger contour edge and the palm outer contour.

In an embodiment, the generating, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets includes:

determining a current auxiliary line type based on a geometry processing type corresponding to a current palm bone point set; generating a current bone point line segment corresponding to the current palm bone point set based on the bone point positions corresponding to the palm bone points in the current palm bone point set; and performing geometry processing on the current bone point line segment based on the current auxiliary line type, to obtain a palm contour auxiliary line corresponding to the current palm bone point set and belonging to the current auxiliary line type.

The auxiliary line type is configured for determining a type of an auxiliary line. The current auxiliary line type is an auxiliary line type of the palm contour auxiliary line corresponding to the current palm bone point set. The bone point line segment is a line segment formed by the palm bone points. The current bone point line segment is a bone point line segment corresponding to the current palm bone point set. Geometry processing is configured for generating a specific type of palm contour auxiliary line based on the bone point line segment.

The current palm bone point set may be any palm bone point set.

Specifically, when generating the palm contour auxiliary line, the computer device may first determine the auxiliary line type corresponding to the palm contour auxiliary line, and then generate the corresponding palm contour auxiliary line. The computer device may determine the current auxiliary line type based on the geometry processing type corresponding to the current palm bone point set, where each geometry processing type has a corresponding auxiliary line type. The computer device may generate a current bone point line segment corresponding to the current palm bone point set based on the bone point positions corresponding to the palm bone points in the current palm bone point set. For example, a line segment is determined by two points, two palm bone points may be obtained from the current palm bone point set, and bone point positions respectively corresponding to the two palm bone points are connected to generate the current bone point line segment. A sequential order of determining the current auxiliary line type and generating the current bone point line segment is not limited in this application. Finally, the computer device may perform geometry processing on the current bone point line segment based on the current auxiliary line type, thereby obtaining the palm contour auxiliary line corresponding to the current auxiliary line type. For example, if the current auxiliary line type is an extension line, an extension line of the current bone point line segment may be used as the palm contour auxiliary line.

In the foregoing embodiment, the current auxiliary line type is determined based on the geometry processing type corresponding to the current palm bone point set; the current bone point line segment corresponding to the current palm bone point set is generated based on the palm bone points in the current palm bone point set; and geometry processing is performed on the current bone point line segment based on the current auxiliary line type, to obtain the palm contour auxiliary line corresponding to the current palm bone point set and belonging to the current auxiliary line type. The auxiliary line type is first determined, and then geometry processing is performed on the bone point line segment generated according to the palm bone point based on the auxiliary line type, to quickly generate the corresponding palm contour auxiliary line.

In an embodiment, the geometry processing type includes any one of a first geometry processing type, a second geometry processing type, or a third geometry processing type, an auxiliary line type corresponding to the first geometry processing type includes at least one of a mid-perpendicular line type or an extension line type, an auxiliary line type corresponding to the second geometry processing type includes a normal line type, and an auxiliary line type corresponding to the third geometry processing type includes at least one of a normal line type or an extension line type.

The geometry processing type includes any one of the first geometry processing type, the second geometry processing type, or the third geometry processing type. The auxiliary line type corresponding to the first geometry processing type includes at least one of a mid-perpendicular line type or an extension line type. The auxiliary palm contour line corresponding to the mid-perpendicular line type is a mid-perpendicular line. The mid-perpendicular line is a straight line passing through a midpoint of a line segment and perpendicular to the line segment. The palm contour auxiliary line corresponding to the extension line type is an extension line. The extension line is a straight line obtained by continuing to extend from an endpoint based on a line segment. The auxiliary line type corresponding to the second geometry processing type includes a normal line type. The palm contour auxiliary line corresponding to the normal line type is a normal line. A normal line of the line segment may also be referred to as a vertical line of the line segment, and the line segment and the corresponding normal line are perpendicular to each other. The auxiliary line type corresponding to the third geometry processing type includes at least one of a normal line type or an extension line type.

In the foregoing embodiment, different geometry processing types correspond to different auxiliary line types, and the same geometry processing type may correspond to at least one auxiliary line type, which can effectively increase the number of palm contour points, thereby improving extraction accuracy of the palm contour.

In an embodiment, the performing geometry processing on the current bone point line segment based on the current auxiliary line type, to obtain a palm contour auxiliary line corresponding to the current palm bone point set and belonging to the current auxiliary line type includes:

when the current auxiliary line type is a mid-perpendicular line type, using a mid-perpendicular line corresponding to the current bone point line segment as the palm contour auxiliary line; when the current auxiliary line type is an extension line type, determining a target bone point from the palm bone points corresponding to the current palm bone point set, and using an extension line corresponding to the current bone point line segment and with the target bone point as a start point as the palm contour auxiliary line; and when the current auxiliary line type is a normal line type, determining the target bone point from the palm bone points corresponding to the current palm bone point set, and using a normal line of the current bone point line segment at the target bone point as the palm contour auxiliary line.

Specifically, if the current auxiliary line type is the mid-perpendicular line type, the computer device may use the mid-perpendicular line corresponding to the current bone point line segment as the palm contour auxiliary line.

If the current auxiliary line type is the extension line type, the computer device may select a palm bone point from the palm bone points corresponding to the current palm bone point set as the target bone point, and use an extension line corresponding to the current bone point line segment and starting from the target bone point as the palm contour auxiliary line. When determining the target bone point, the computer device may use a palm bone point closer to the palm as the target bone point, or may use a palm bone point of a specified bone point type in the current palm bone point set as the target bone point, or may respectively use each palm bone point in the current palm bone point set as the target bone point.

If the current auxiliary line type is the normal line type, the computer device may select a palm bone point from the palm bone points corresponding to the current palm bone point set as the target bone point, and use a normal line of the current bone point line segment at the target bone point as the palm contour auxiliary line. When determining the target bone point, the computer device may respectively use each palm bone point as the target bone point, thereby generating a plurality of palm contour auxiliary lines, or may select a palm bone point as the target bone point, thereby generating a palm contour auxiliary line. The palm bone point may be randomly selected, or a palm bone point closer to a fingertip may be selected.

In the foregoing embodiment, when the current auxiliary line type is the mid-perpendicular line type, the mid-perpendicular line corresponding to the current bone point line segment is used as the palm contour auxiliary line; when the current auxiliary line type is the extension line type, the target bone point is determined from the palm bone points corresponding to the current palm bone point set, and the extension line corresponding to the current bone point line segment and with the target bone point as the start point is used as the palm contour auxiliary line; and when the current auxiliary line type is the normal line type, the target bone point is determined from the palm bone points corresponding to the current palm bone point set, and the normal line of the current bone point line segment at the target bone point is used as the palm contour auxiliary line. For different auxiliary line types, different geometric methods may be used to quickly generate the corresponding palm contour auxiliary line.

In an embodiment, the determining a palm contour point from the palm contour auxiliary line corresponding to the palm bone point set based on a reference step size corresponding to the same palm bone point set and the bone point positions, to obtain a contour point position corresponding to the palm contour point includes:

generating, based on the bone point positions corresponding to the bone points in a current palm bone point set, a current bone point line segment corresponding to the current palm bone point set; determining a reference point from the current bone point line segment; and moving, with the reference point as a start point, the reference step size corresponding to the current palm bone point set on a current palm contour auxiliary line corresponding to the current palm bone point set according to a movement direction corresponding to the current palm contour auxiliary line, to obtain a current palm contour point and a contour point position corresponding to the current palm contour point.

The current palm contour auxiliary line is a palm contour auxiliary line corresponding to the current palm bone point set.

Specifically, when determining the palm contour point, the computer device may determine the reference point from the bone point line segment, move, with the reference point as the start point, the step size on the palm contour auxiliary line according to the movement direction, and use a movement end point as the palm contour point. First, the computer device may generate the current bone point line segment corresponding to the current palm bone point set based on the bone point positions corresponding to the bone points in the current palm bone point set. Next, the computer device may determine the reference point from the current bone point line segment. For example, any endpoint of the current bone point line segment may be used as the reference point, or an intersection point between the current bone point line segment and the current palm contour auxiliary line may be used as the reference point. Then, with the reference point as the start point, the computer device moves the reference step size corresponding to the current palm bone point set on the current palm contour auxiliary line according to the movement direction corresponding to the current palm contour auxiliary line, thereby determining the current palm contour point and the contour point position corresponding to the current palm contour point. Each of the palm contour auxiliary lines of different types has a corresponding movement direction, and the palm contour auxiliary lines of the same type correspond to at least one movement direction.

In an embodiment, the reference step size increases as a length of a line segment corresponding to the current bone point line segment increases. The length of the line segment corresponding to the current bone point line segment may reflect the personalization information of the palm from the side. A longer length of the line segment indicates a larger palm. For a larger palm, more reference step sizes need to be moved on the palm contour auxiliary line to reach the accurate palm contour point.

In the foregoing embodiment, based on the bone point positions corresponding to the bone points in the current palm bone point set, the current bone point line segment corresponding to the current palm bone point set is generated; the reference point is determined from the current bone point line segment; and with the reference point as the start point, the reference step size corresponding to the current palm bone point set is moved on the current palm contour auxiliary line corresponding to the current palm bone point set according to the movement direction corresponding to the current palm contour auxiliary line, to obtain the current palm contour point and the contour point position corresponding to the current palm contour point. In this way, with the reference point determined according to the palm bone point as the start point, the corresponding reference step size is moved on the palm contour auxiliary line according to the movement direction corresponding to the palm contour auxiliary line, so that an accurate palm contour point can be quickly obtained.

In an embodiment, the current palm contour auxiliary line includes at least one of a mid-perpendicular line, an extension line, or a normal line, a movement direction corresponding to the mid-perpendicular line is a direction opposite to a palm, a movement direction corresponding to the extension line is an extension direction of the extension line, and a movement direction corresponding to the normal line is a vertical direction of the current bone point line segment.

The current palm contour auxiliary line includes at least one of a mid-perpendicular line, an extension line, or a normal line.

Figure 4:
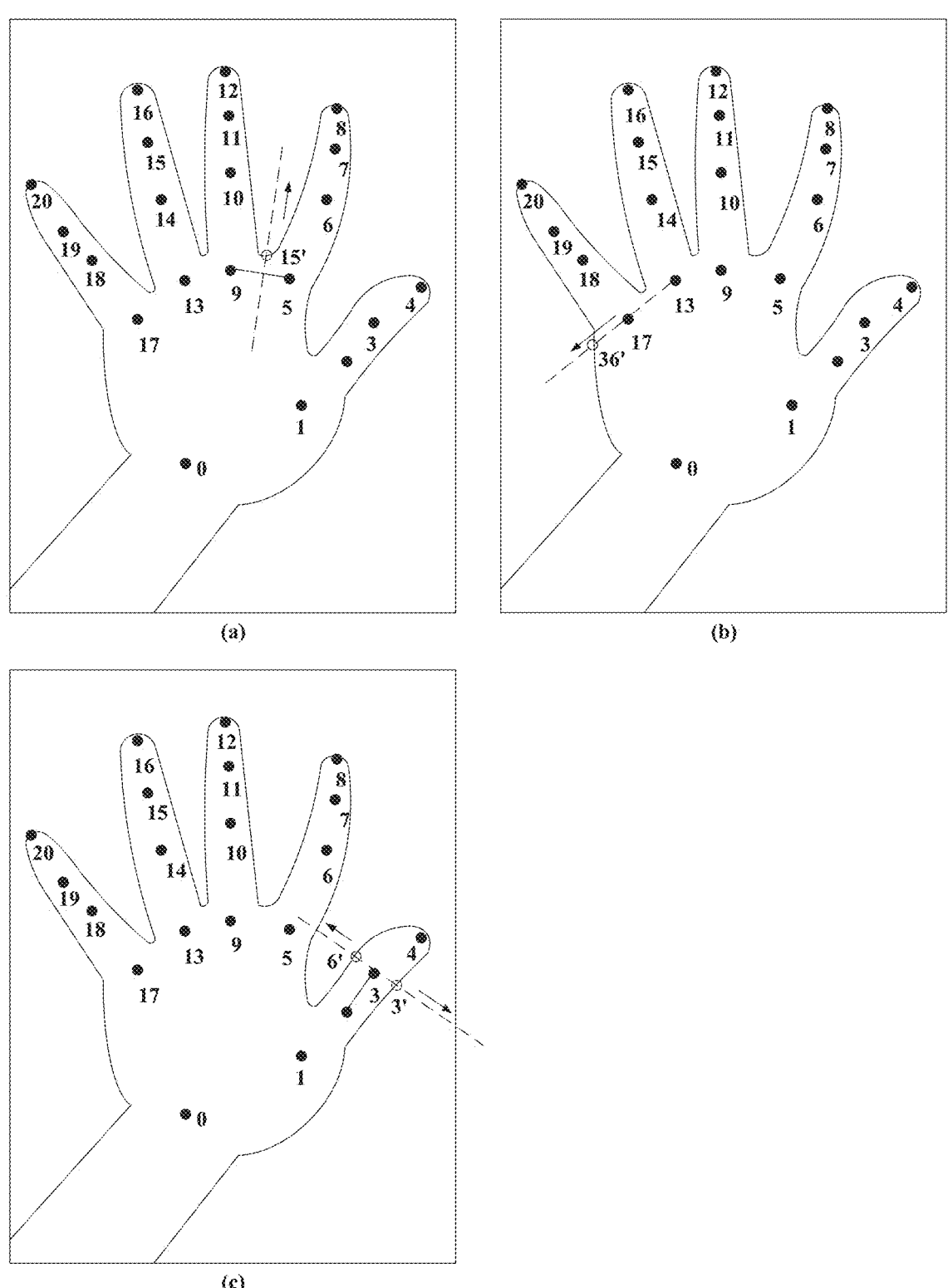
FIG. 4 is schematic diagrams of movement directions corresponding to palm contour auxiliary lines according to an embodiment.

The movement direction corresponding to the mid-perpendicular line is the direction opposite to the palm, and the direction opposite to the palm is a direction away from the palm. That is, the palm contour point needs to be determined by moving the reference step size on the palm contour auxiliary line of the mid-perpendicular line type in the direction away from the palm. For example, referring to (a) in FIG. 4, a dashed line in (a) represents a mid-perpendicular line, an arrow represents a direction opposite to a palm, and dot 15' represents a palm contour point determined by moving the reference step size on the mid-perpendicular line in the direction opposite to the palm.

The movement direction corresponding to the extension line is the extension direction of the extension line. That is, the palm contour point needs to be determined by moving the reference step size on the palm contour auxiliary line of the extension line type in the extension direction of the extension line. For example, referring to (b) in FIG. 4, a dashed line in (b) represents an extension line, an arrow represents an extension direction of the extension line, and dot 36' represents a palm contour point determined by moving the reference step size on the extension line according to the extension direction of the extension line.

The movement direction corresponding to the normal line is the vertical direction of the current bone point line segment. That is, the palm contour point needs to be determined by moving the reference step size on the palm contour auxiliary line of the normal line type in the vertical direction of the bone point line segment. For example, referring to (c) in FIG. 4, a dashed line in (c) represents a normal line, an arrow represents a vertical direction of the normal line, and dot 3' and dot 6' represent palm contour points determined by moving the reference step size on the normal line according to the vertical direction of the bone point line segment.

In the foregoing embodiment, the movement direction corresponding to the mid-perpendicular line is the direction opposite to the palm, the movement direction corresponding to the extension line is the extension direction of the extension line, and the movement direction corresponding to the normal line is the vertical direction of the current bone point line segment. The palm contour auxiliary lines of different types correspond to different movement directions.

In an embodiment, each palm bone point has a corresponding bone point identifier. The generating a palm contour corresponding to the target palm image based on the contour point positions includes:

mapping the bone point identifiers corresponding to the palm bone points based on preset mapping information, to obtain contour point sorting identifiers corresponding to the palm contour points, where the preset mapping information includes an identifier mapping relationship between the palm bone points in the palm bone point set and the palm contour points generated based on the palm bone point set; and connecting the contour point positions corresponding to the palm contour points in order according to the contour point sorting recognizers, to obtain the palm contour corresponding to the target palm image.

The bone point identifier is configured for uniquely identifying the palm bone point. The contour point sorting identifier is configured for identifying an arrangement order of the palm contour points.

The preset mapping information records the identifier mapping relationship between the palm bone points in the palm bone point set and the palm contour points generated based on the palm bone point set. For example, a palm contour point generated based on palm bone point 0 and palm bone point 1 is marked as 1', and palm contour points generated based on palm bone point 1 and palm bone point 2 are marked as 2' and 7'.

Specifically, when the palm contour is generated based on the contour point positions, the palm contour points may be connected in order to obtain the palm contour. When determining the sorting information of the palm contour points, the computer device may obtain the preset mapping information, map the bone point identifiers corresponding to the palm bone points, to generate the contour point identifiers corresponding to the palm contour points generated based on the palm bone points, and finally obtain the contour point sorting identifiers respectively corresponding to the palm contour points. Further, the computer device may connect the contour point positions corresponding to the palm contour points in order according to the contour point sorting identifiers, to obtain a correct palm contour.

Figure 5:
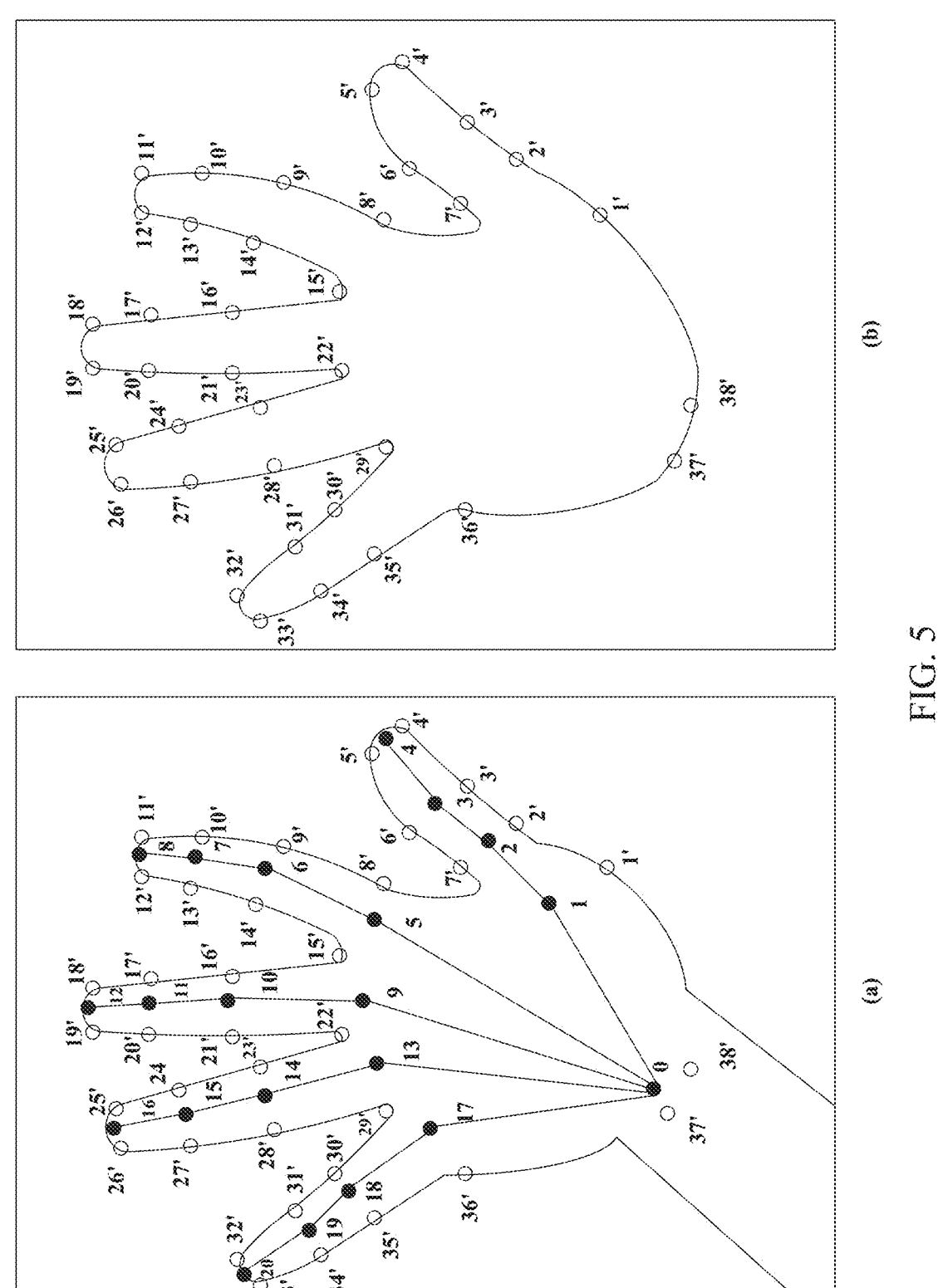
FIG. 5 is schematic diagrams of contour point sorting identifiers and a palm contour according to an embodiment.

For example, referring to FIG. 5, black dots in FIG. 5 represent palm bone points, and white dots represent palm contour points. (a) in FIG. 5 represents a target palm image. Palm contour points 1' to 38' may be obtained based on palm bone points 0 to 20. (b) in FIG. 5 represents a palm contour. The palm contour may be obtained by connecting the palm contour points 1' to 38' in order.

In an embodiment, the contour point positions may be smoothly connected or straightly connected.

In the foregoing embodiment, the bone point identifiers corresponding to the palm bone points are mapped based on the preset mapping information, to obtain the contour point sorting identifiers corresponding to the palm contour points, where the preset mapping information includes the identifier mapping relationship between the palm bone points in the palm bone point set and the palm contour points generated based on the palm bone point set; and the contour point positions corresponding to the palm contour points are connected in order according to the contour point sorting identifiers, to obtain the palm contour. In this way, the contour point sorting identifiers corresponding to the palm contour points can be quickly determined through the preset mapping information, so that the palm contour points can be connected in order based on the contour point sorting identifiers to generate an accurate palm contour.

In an embodiment, the obtaining the bone point information respectively corresponding to palm bone points in the target palm image includes:

inputting the target palm image into a target palm bone point recognition model, to obtain the bone point information respectively corresponding to the palm bone points.

The target palm bone point recognition model is a trained palm bone point recognition model. Input data of the palm bone point recognition model is a palm image, and output data is the bone point information respectively corresponding to the palm bone points in the palm image.

Specifically, the computer device may recognize the palm bone points based on a machine learning model. The computer device may obtain a pre-trained target palm bone point recognition model and input the target palm image into the target palm bone point recognition model, and through data processing of the model, the model finally outputs the bone point information respectively corresponding to the palm bone points.

A training process of the target palm bone point recognition model includes the following operations: obtaining a training data set, where the training data set includes a plurality of training palm images and training bone point information respectively corresponding to the training palm images; determining a current palm image from the training data set; inputting the current palm image into an initial palm bone point recognition model, to obtain predicted bone point information corresponding to the current palm image; adjusting a model parameter corresponding to the initial palm bone point recognition model based on a difference between the predicted bone point information corresponding to the current palm image and the training bone point information, to obtain an intermediate bone point recognition model; and using a next training palm image as the current palm image, using the intermediate bone point recognition model as the initial palm bone point recognition model, and going back to perform the operation of inputting the current palm image into an initial palm bone point recognition model until a convergence condition is met, to obtain the target bone point recognition model.

The initial palm bone point recognition model is a to-be-trained palm bone point recognition model. The training palm image is a palm image of which the bone point information is known. The current palm image is any palm image in the training data set. The training bone point information is accurate bone point information. The predicted bone point information is bone point information predicted by the model.

Specifically, during model training, the computer device may obtain the training data set, and perform model training on the initial palm bone point recognition model based on the training data set, to obtain the target palm bone point recognition model. A target training image in the training data set is used as the input data of the palm bone point recognition model, and the training bone point information is used as expected output data of the palm bone point recognition model. A training objective of the model is to make actual output data closer to the expected output data of the model, so that the model can output the predicted bone point information close to the training bone point information, to correctly recognize the palm bone points in the palm image.

The computer device may randomly select a training palm image from the training data set as the current palm image and input the current palm image into the initial palm bone point recognition model. Through data processing of the model, the model outputs the predicted bone point information corresponding to the current palm image. Further, the computer device generates loss information based on the difference between the predicted bone point information corresponding to the current palm image and the training bone point information, performs back propagation based on the loss information, and adjusts the model parameter of the initial palm bone point recognition model, thereby obtaining the intermediate palm bone point recognition model. The computer device obtains a next training palm image as a new training palm image, uses the intermediate palm bone point recognition model as a new initial palm bone point recognition model, goes back to perform the operation of inputting the current palm image into the initial palm bone point recognition model to obtain the predicted bone point information corresponding to the current palm image, to perform model iterative training, and continuously adjusts the model parameter through a plurality of times of model iterative training until a second convergence condition is met, to obtain a target palm bone point recognition model.

The second convergence condition may be at least one of conditions such as the loss information being less than a preset threshold or the number of model iterations being greater than a preset number of times. For example, if in a round of training, the loss information obtained through calculation based on the difference between the predicted bone point information and the training bone point information is less than the preset threshold, adjustment of the model parameter is stopped, and a latest palm bone point recognition model obtained through adjustment is used as the target palm bone point recognition model. The latest palm bone point recognition model obtained through adjustment is used as the target palm bone point recognition model if the number of model iterations after a round of training is greater than the preset number of times.

A current palm image determined in each round of training may include at least one training palm image.

In the foregoing embodiment, the palm bone points in the palm image are recognized by using the target palm bone point recognition model, which can ensure recognition accuracy and recognition efficiency. Through a supervised iterative training manner, an accurate target palm bone point recognition model may be obtained through training.

In an embodiment, the palm contour is configured for generating a palm animation.

Specifically, after the palm contour is generated, the palm animation may be generated based on the palm contour, and the palm animation is displayed.

In an embodiment, the computer device may collect the palm image in real time, recognize the palm contour in the palm image in real time, and display a dynamic palm contour to form a dynamic palm animation. In an embodiment, the computer device may set a display parameter of the palm contour to generate the palm animation. For example, the palm contour is displayed by using dynamically changing gradient colors. In an embodiment, the computer device may set a display parameter of a closed region formed by the palm contour to generate the palm animation. For example, the closed region formed by the palm contour is displayed by using dynamically changing rainbow colors.

In the foregoing embodiment, the palm contour extracted from the palm image may be configured for generating the palm animation, thereby improving fun and interactivity.

Figure 6:
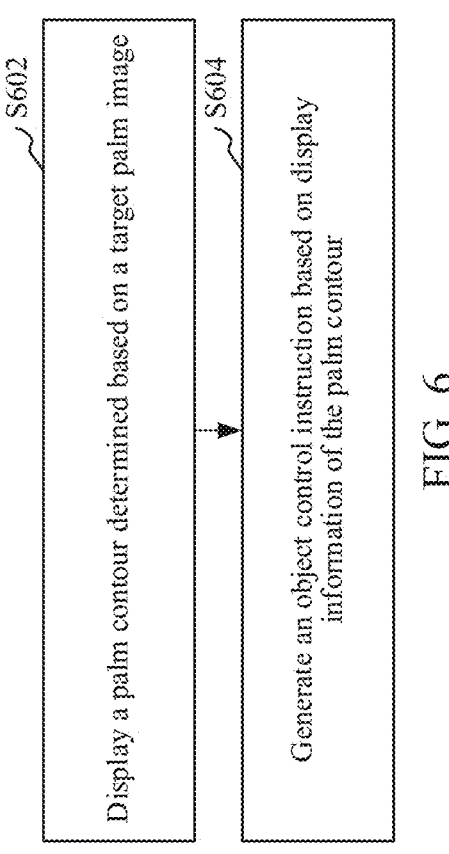
FIG. 6 is a schematic flowchart of a control instruction generation method according to an embodiment.

In an embodiment, as shown in FIG. 6, a control instruction generation method is provided. An example in which the method is applied to a terminal is used for description. The method may also be applied to a server, or may be applied to a system including a terminal and a server, and is implemented through interaction between the terminal and the server. In this embodiment, the control instruction generation method includes the following operations:

S602: Display a palm contour determined based on a target palm image.

An extraction process of the palm contour includes the following operations: obtaining bone point information respectively corresponding to palm bone points in the target palm image, the bone point information including bone point positions and bone point types; matching the palm bone points based on the bone point types, to obtain a plurality of palm bone point sets, each palm bone point set having a corresponding geometry processing type; generating, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets; determining a palm contour point from the palm contour auxiliary line corresponding to the palm bone point set based on a reference step size corresponding to the same palm bone point set and the bone point positions, to obtain a contour point position corresponding to the palm contour point; and generating a palm contour corresponding to the target palm image based on the contour point positions.

For a specific extraction process of the palm contour, reference may be made to content of the embodiments of the foregoing palm contour extraction method. Details are not described herein again.

S604: Generate an object control instruction based on display information of the palm contour.

The display information is configured for reflecting a display situation of the palm contour. The display information includes at least one type of data of a display position, a display size, a display depth, and a display posture.

The object control instruction is an instruction for controlling and operating an object. The controlled object may be a virtual object, for example, a virtual resource, a virtual person, or a virtual control. The controlled object may also be a physical object, for example, an electronic device or a mechanical device. The object control instruction may be a variety of control instructions. In an embodiment, the object control instruction may be an instruction for enabling or disabling one or some functions of the object. For example, the object control instruction may be a light-on instruction, a light-off instruction, a test start instruction, or a test abort instruction. In an embodiment, the object control instruction may be an instruction for controlling the object to move. For example, the object control instruction may be a virtual resource transfer instruction or a virtual person jumping instruction. In an embodiment, the object control instruction may be an instruction for controlling to adjust an attribute parameter of the object. For example, the object control instruction may be a paintbrush color adjustment instruction or a window size adjustment instruction.

Specifically, the terminal displays the palm contour determined based on the target palm image, and generates the object control instruction based on the display information of the palm contour. The terminal may autonomously execute the object control instruction, and control the corresponding object through the object control instruction. The terminal may alternatively transmit the object control instruction to another device, and instruct another device through the object control instruction to control the object.

In an embodiment, if the display information of the palm contour meets a preset condition, the object control instruction is generated, and if the display information of the palm contour does not meet the preset condition, prompt information is generated. For example, the object control instruction may be generated if a position difference between a display position of the palm contour and a target display position is less than a preset threshold, the object control instruction may be generated if a display size of the palm contour is greater than a preset size; the object control instruction may be generated if a display depth difference of the palm contour is less than a preset difference; or the like. For example, a closed region formed by the palm contour may be divided to obtain at least two sub-regions, depth average values corresponding to the sub-regions are counted, and a data difference between the depth average values is counted to obtain the display depth difference. The object control instruction is generated if the display depth difference is less than the preset difference, it indicates that depth values corresponding to pixel points in a palm do not differ greatly and the palm is placed properly. The prompt information may prompt that the current palm is placed wrongly, or may prompt to move the palm.

In an embodiment, the object control instruction corresponding to the display information may be generated based on the display information of the palm contour. For example, the corresponding object control instruction may be generated based on a display posture of the palm contour. For example, if the display posture of the palm contour is that the fingers are open, a function enable instruction is generated. If the display posture corresponding to the palm contour is that the fingers are close, a function disable instruction is generated.

In the foregoing control instruction generation method, the palm contour determined based on the target palm image is displayed, and the object control instruction is generated based on the display information of the palm contour. An extraction process of the palm contour includes the following operations: obtaining bone point information respectively corresponding to palm bone points in the target palm image, the bone point information including bone point positions and bone point types; matching the palm bone points based on the bone point types, to obtain a plurality of palm bone point sets, each palm bone point set having a corresponding geometry processing type; generating, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets; determining a palm contour point from the palm contour auxiliary line corresponding to the palm bone point set based on a reference step size corresponding to the same palm bone point set and the bone point positions, to obtain a contour point position corresponding to the palm contour point; and generating a palm contour corresponding to the target palm image based on the contour point positions. In this way, the contour point positions corresponding to the palm contour points are determined by performing geometry processing based on the bone point information corresponding to the palm bone points in the palm image, and the palm contour is generated based on the contour point positions corresponding to the palm contour points. The palm contour is extracted without the need to perform complex data processing on pixel information of the palm image, and has high extraction accuracy for being not susceptible to interference from image backgrounds. Extracting an accurate palm contour is also helpful to ensure accurate display, and further helpful to improve generation accuracy of the object control instruction. The object control instruction is automatically generated based on the display information of the palm contour, which can also improve the generation efficiency of the object control instruction.

In an embodiment, the generating an object control instruction based on display information of the palm contour includes:

generating the object control instruction when a position difference between a display position of the palm contour and a target display position is less than a preset threshold; and generating palm movement prompt information based on the position difference when the position difference is greater than or equal to the preset threshold, where the palm movement prompt information is configured for prompting to move the palm to reduce the position difference.

The target display position is an expected display position. The target display position may be set according to actual requirements. The palm movement prompt information may be presented in at least one expression form of a text, a speech, a picture, or a video.

Specifically, the display information includes a display position. If the position difference between the display position of the palm contour and the target display position is less than the preset threshold, which indicates that the palm contour is displayed at the expected position and the target position, the terminal triggers to generate the object control instruction. If the position difference between the display position of the palm contour and the target display position is greater than or equal to the preset threshold, which indicates that the palm contour is not displayed at the expected position and the target position, the terminal may generate the palm movement prompt information based on the position difference. The palm movement prompt information is configured for prompting to move the palm to reduce the position difference, so that the palm contour may be finally displayed at the expected position.

In an embodiment, the terminal may determine the display position of the palm contour based on a spatial position of the palm. For example, if the palm is right above the image collection device, the palm contour is displayed in the middle of a screen. If the palm is on the left of the image collection device, the palm contour is displayed on the left of the screen. If the palm is on the right of the image collection device, the palm contour is displayed on the right of the screen.

In the foregoing embodiment, the object control instruction is generated when the position difference between the display position of the palm contour and the target display position is less than the preset threshold, and the palm movement prompt information is generated based on the position difference when the position difference is greater than or equal to the preset threshold, where the palm movement prompt information is configured for prompting to move the palm to reduce the position difference. In this way, the object control instruction is generated only when the position difference between the display position of the palm contour and the target display position is small, which can avoid blindly generating the object control instruction, and ensure effective trigger and accurate trigger of the object control instruction. When the position difference between the display position of the palm contour and the target display position is large, the palm movement prompt information is generated to prompt to move the palm. Correct guidance can be implemented through the palm movement prompt information, so that the palm contour can be displayed at a correct position, thereby triggering the object control instruction.

In an embodiment, the target palm image is a palm image corresponding to a virtual resource transfer party, the object control instruction is a virtual resource transfer instruction, and the virtual resource transfer instruction is configured for instructing to transfer a virtual resource to a target account from a resource account corresponding to the virtual resource transfer party.

The virtual resource transfer party is a party that needs to transfer the virtual resource from the resource account. Opposed to the virtual resource transfer party is a virtual resource receiving party. The virtual resource receiving party is a party that receives the virtual resource. The resource account is an account that may store the virtual resource. The virtual resource is a resource that exists in an electronic account and can be circulated, such as a currency, a virtual red envelope, a game currency, or a virtual item. The target account is an account that needs to receive the transferred virtual resource. The target account may be an individual account or a collective account.

Specifically, in a virtual resource transfer scenario, a terminal corresponding to the virtual resource transfer party or the virtual resource receiving party or another terminal may trigger to generate the virtual resource transfer instruction based on the palm image, and the virtual resource transfer instruction is configured for instructing to transfer the virtual resource to the target account from the resource account corresponding to the resource transfer party.

For example, the terminal collects a palm image corresponding to the virtual resource transfer party as the target palm image, extracts a palm contour in the target palm image, and displays the palm contour determined based on the target palm image. When a position difference between a display position of the palm contour and a target display position is less than a preset threshold, the terminal verifies identity information of the virtual resource transfer party based on the target palm image. The virtual resource transfer instruction is generated if the verification succeeds, where the virtual resource transfer instruction is configured for instructing to transfer the virtual resource to the target account from the resource account corresponding to the virtual resource transfer party, and verification failure prompt information is generated if the verification fails. When the position difference is greater than or equal to the preset threshold, the terminal generates palm movement prompt information based on the position difference, where the palm movement prompt information is configured for prompting to move the palm to reduce the position difference. Subsequently, after the palm is moved, if a new position difference determined by the terminal based on the new palm image is less than the preset threshold, the identity information of the virtual resource transfer party is verified based on the new palm image, and if the verification succeeds, the virtual resource transfer instruction is generated.

In the foregoing embodiment, the palm contour extracted from the palm image may be configured for triggering to generate the virtual resource transfer instruction, which expands a trigger manner of the virtual resource transfer instruction.

In a specific embodiment, the foregoing palm contour extraction method may be applied in a palm-scanning payment scenario. Specifically, the palm contour extraction method is applied in the application scenario as follows:
1. Recognize a Palm Contour
1-1. Recognize Palm Bone Points
Palm bone points in a palm image are recognized based on a machine learning algorithm. The palm image is obtained through a camera, the palm image is inputted into a trained machine learning model, and the model outputs bone point information of the palm bone points in the palm image. In an embodiment, the machine learning model may be integrated in an SDK (Software Development Kit). The bone point information includes position coordinates of the palm bone points. The position coordinates of the palm bone points may be mapped onto two-dimensional coordinates of a screen of a current operating system through a coordinate system in the SDK, and then a palm contour is generated through the screen coordinates. The current operating system includes an android system, a windows system, and the like.

Figure 7A:
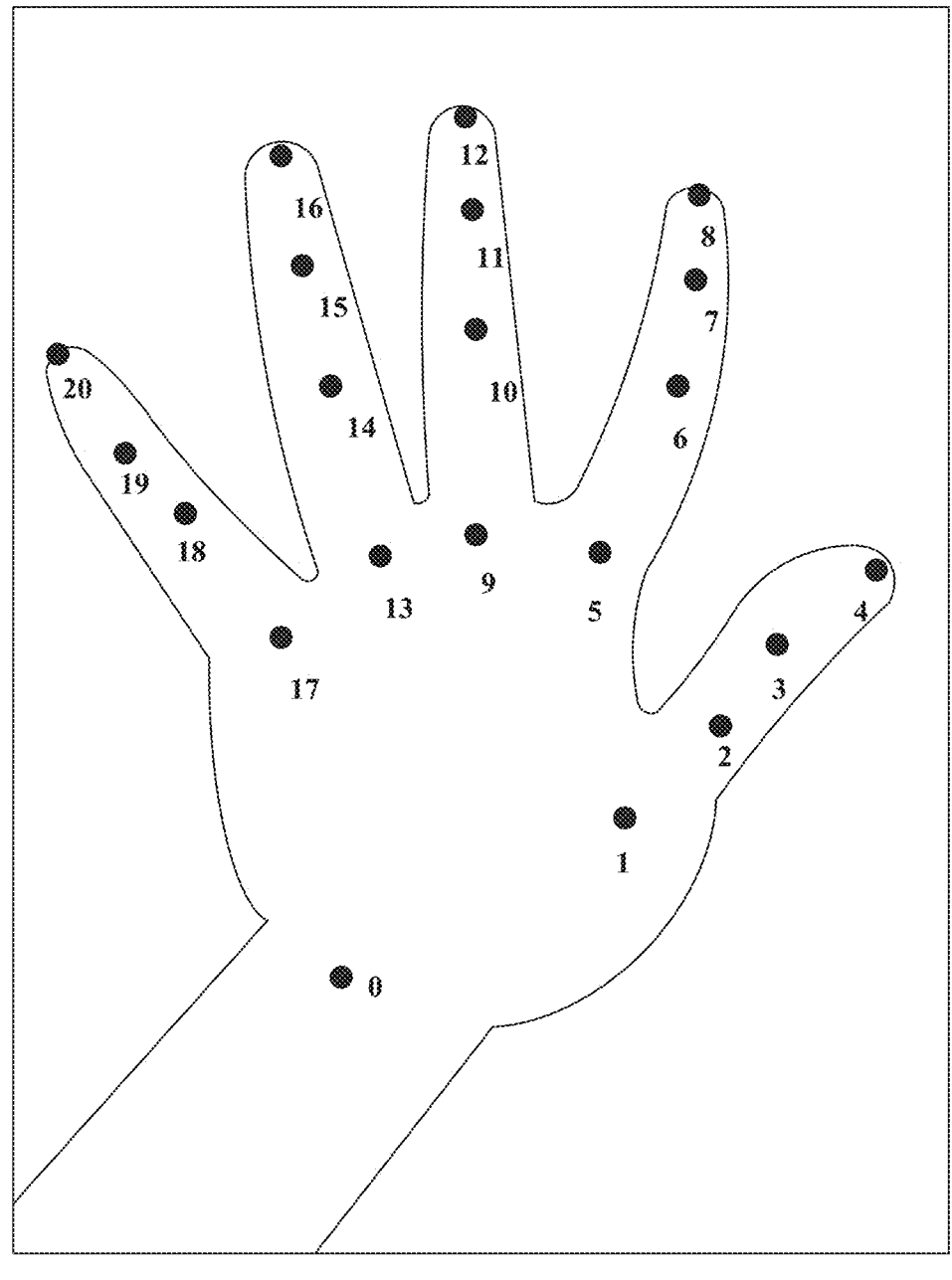
FIG. 7A is a schematic diagram of a palm bone point recognition result according to an embodiment.
Figure 7B:
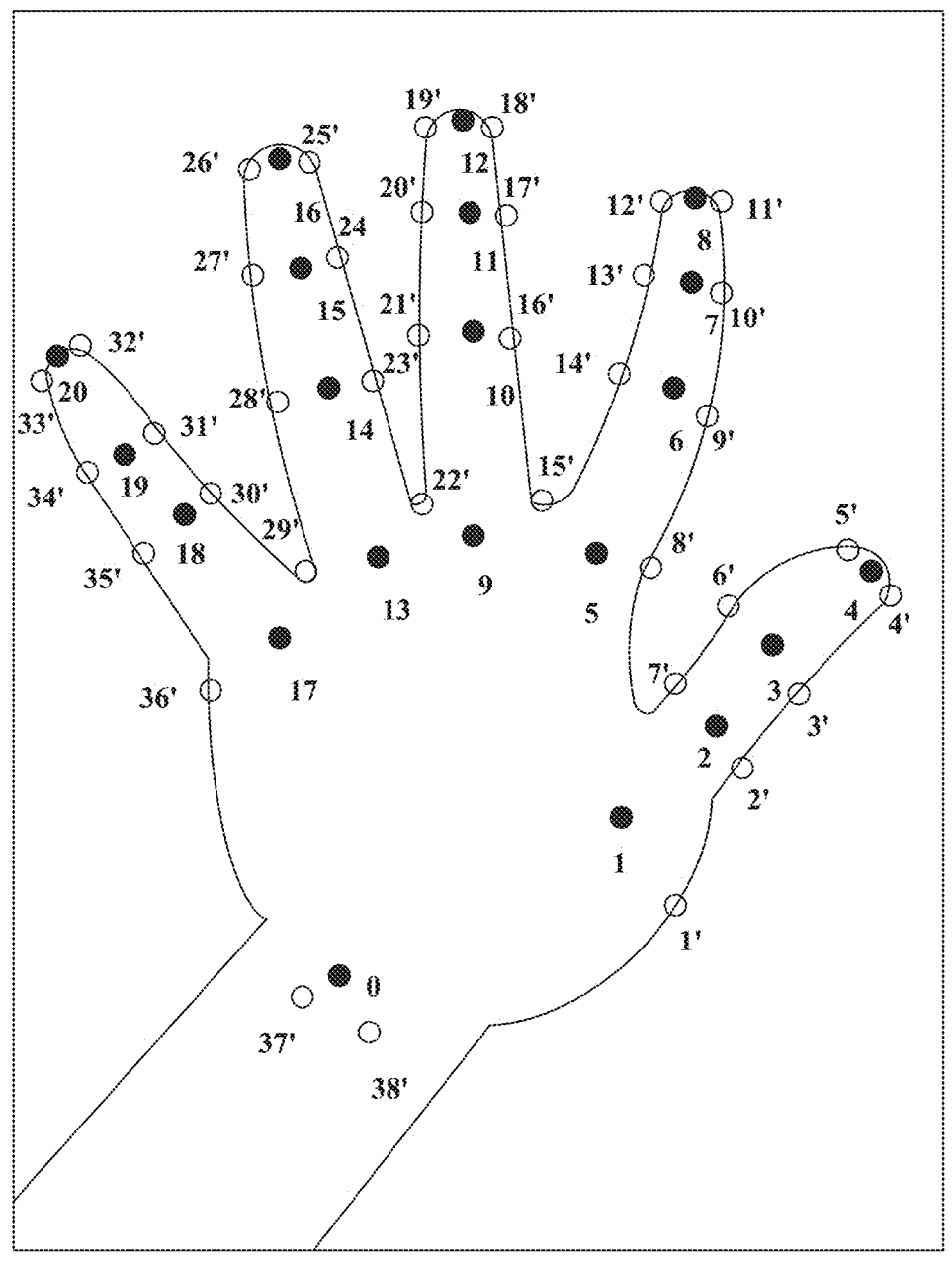
FIG. 7B is a schematic diagram of a palm contour point recognition result according to an embodiment.
Figure 8A:
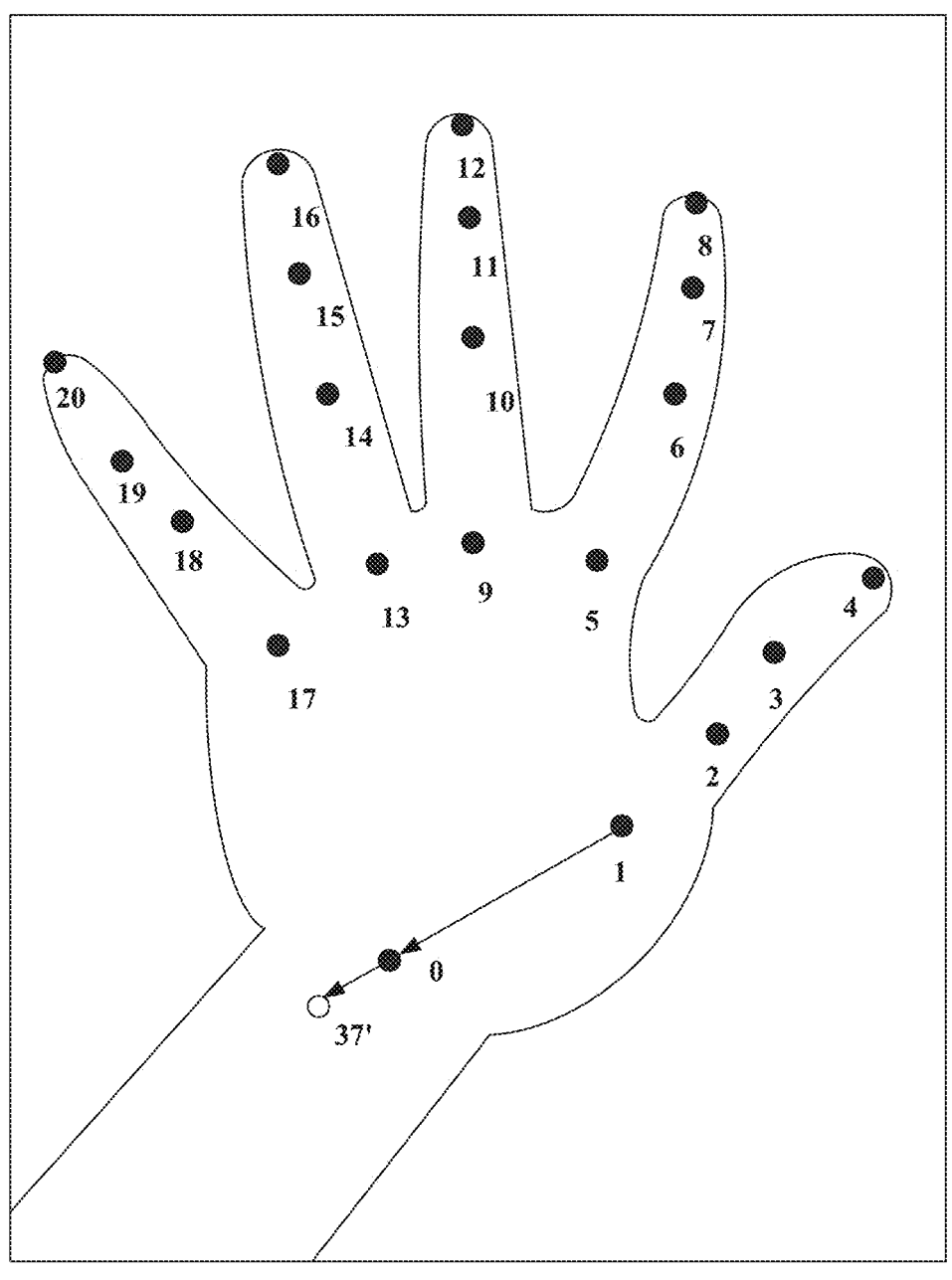
FIG. 8A is a schematic diagram of calculating coordinates of a palm outer contour according to an embodiment.

FIG. 7A is a schematic diagram of a palm bone point recognition result. Referring to FIG. 7A, 21 palm bone points (palm bone point 0 to palm bone point 20) in the palm image are finally recognized.
1-2. Recognize Palm Contour Points
FIG. 7B is a schematic diagram of a palm contour point recognition result. Referring to FIG. 7B, 38 palm contour points (palm contour point 1' to palm contour point 38') are recognized based on the 21 palm bone points.
1-2-1. Calculate Coordinates of a Palm Outer Contour
Coordinates of a palm outer contour on an extension line are obtained by using the extension line (which may also be referred to as an extension line) of two palm bone points and a relative coefficient (which may also be referred to as a reference step size). For example, referring to FIG. 8A, palm contour point 37' is determined on an extension line generated based on palm bone point 0 and palm bone point 1. Palm contour point 37' is a palm outer contour point.

A calculation process of the coordinates of the palm outer contour is as follows:

Start point coordinates of a palm bone point: (Xa, Ya); and
    end point coordinates of the palm bone point: (Xb, Yb)
Target point coordinates of a palm contour point: (X, Y)
Target point coordinate X:

$$X = \frac{Xb - Xa}{\sqrt{(Xb - Xa)^2 + (Yb - Ya)^2}} * k + Xb$$

Target point coordinate Y:

$$Y = \frac{Yb - Ya}{\sqrt{(Xb - Xa)^2 + (Yb - Ya)^2}} * k + Yb$$

Referring to FIG. 7B, palm contour point 37', palm contour point 38', palm contour point 36', and palm contour point 8' are palm outer contour points.

1-2-2. Calculate Coordinates of an Interdigit

Figure 8B:
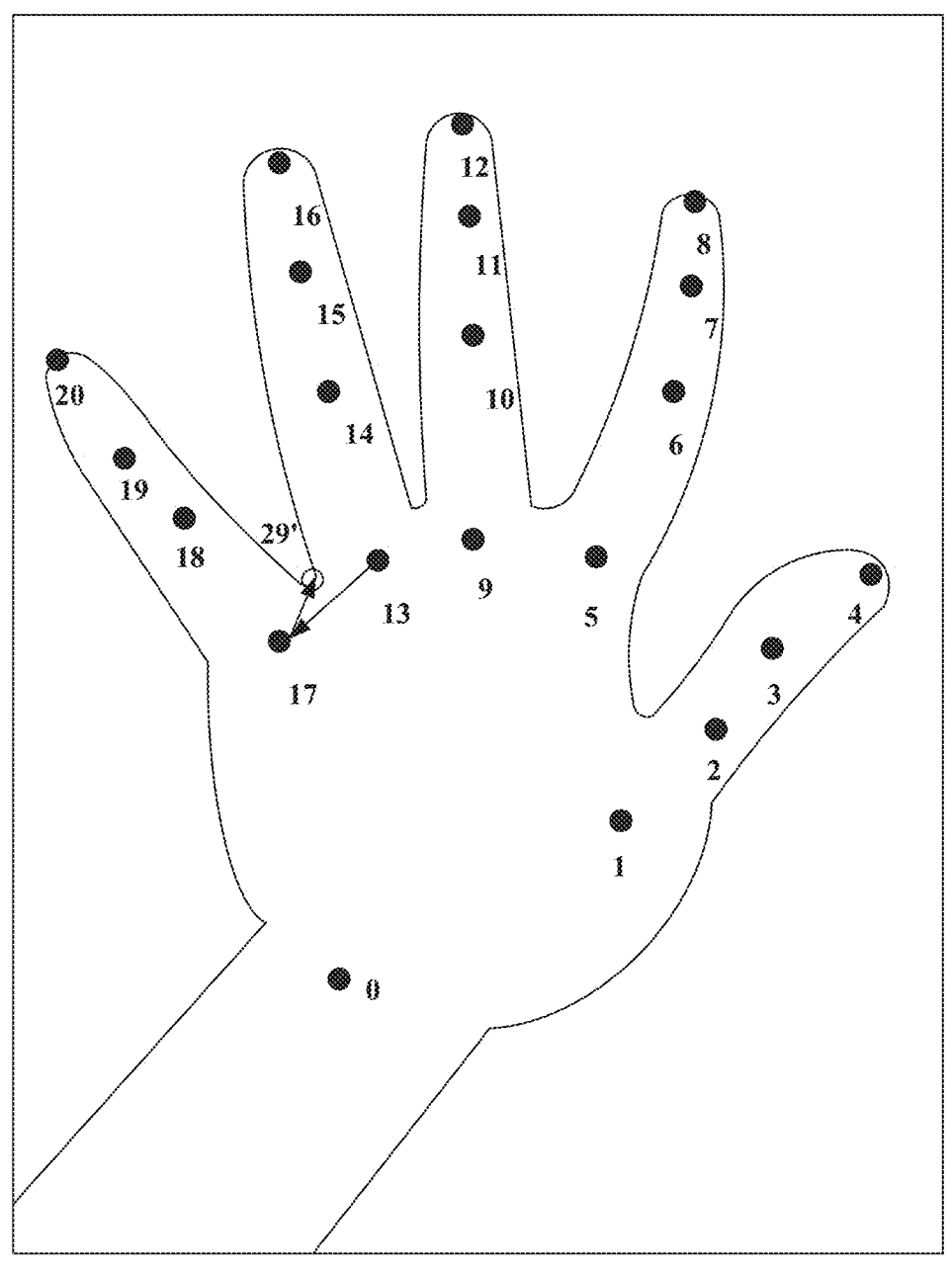
FIG. 8B is a schematic diagram of calculating coordinates of an interdigit according to an embodiment.

Interdigit coordinates on a mid-perpendicular line are obtained by using a mid-perpendicular line of two palm bone points and a relative coefficient. For example, referring to FIG. 8B, palm contour point 29' is determined on a mid-perpendicular line generated based on palm bone point 13 and palm bone point 17. Palm contour point 29' is a palm interdigit point.

A calculation process of the coordinates of the interdigit is as follows:

Start point coordinates of a palm bone point: (Xa, Ya); and end point coordinates of the palm bone point: (Xb, Yb)

Midpoint coordinates: (Xmid, Ymid)

Xmid:

$$Xmid = \frac{Xa + Xb}{2}$$

Ymid:

$$Ymid = \frac{Ya + Yb}{2}$$

Target point coordinates of a palm contour point: (X, Y)

If the target point is in a clockwise direction:

Target point coordinate X:

$$X = \frac{Ya - Yb}{\sqrt{(Xb - Xa)^2 + (Yb - Ya)^2}} * k + Xmid$$

Target point coordinate Y:

$$Y = \frac{Xb - Xa}{\sqrt{(Xb - Xa)^2 + (Yb - Ya)^2}} * k + Ymid$$

If the target point is in a counterclockwise direction:

Target point coordinate X:

$$X = \frac{Yb - Ya}{\sqrt{(Xb - Xa)^2 + (Yb - Ya)^2}} * k + Xmid$$

Target point coordinate Y:

$$Y = \frac{Xa - Xb}{\sqrt{(Xb - Xa)^2 + (Yb - Ya)^2}} * k + Ymid$$

Referring to FIG. 7B, palm contour point 29', palm contour point 22', and palm contour point 15' are palm interdigit points.

Using palm bone point 13 and palm bone point 17 as an example, if palm bone point 13 is used as a start point and the palm bone point 17 is used as an end point, palm contour point 29' is determined in a clockwise direction. If palm bone point 17 is used as a start point and palm bone point 13 is used as an end point, palm contour point 29' is determined in a counterclockwise direction.

1-2-3. Calculate Coordinates of a Finger Contour Edge

Figure 8C:
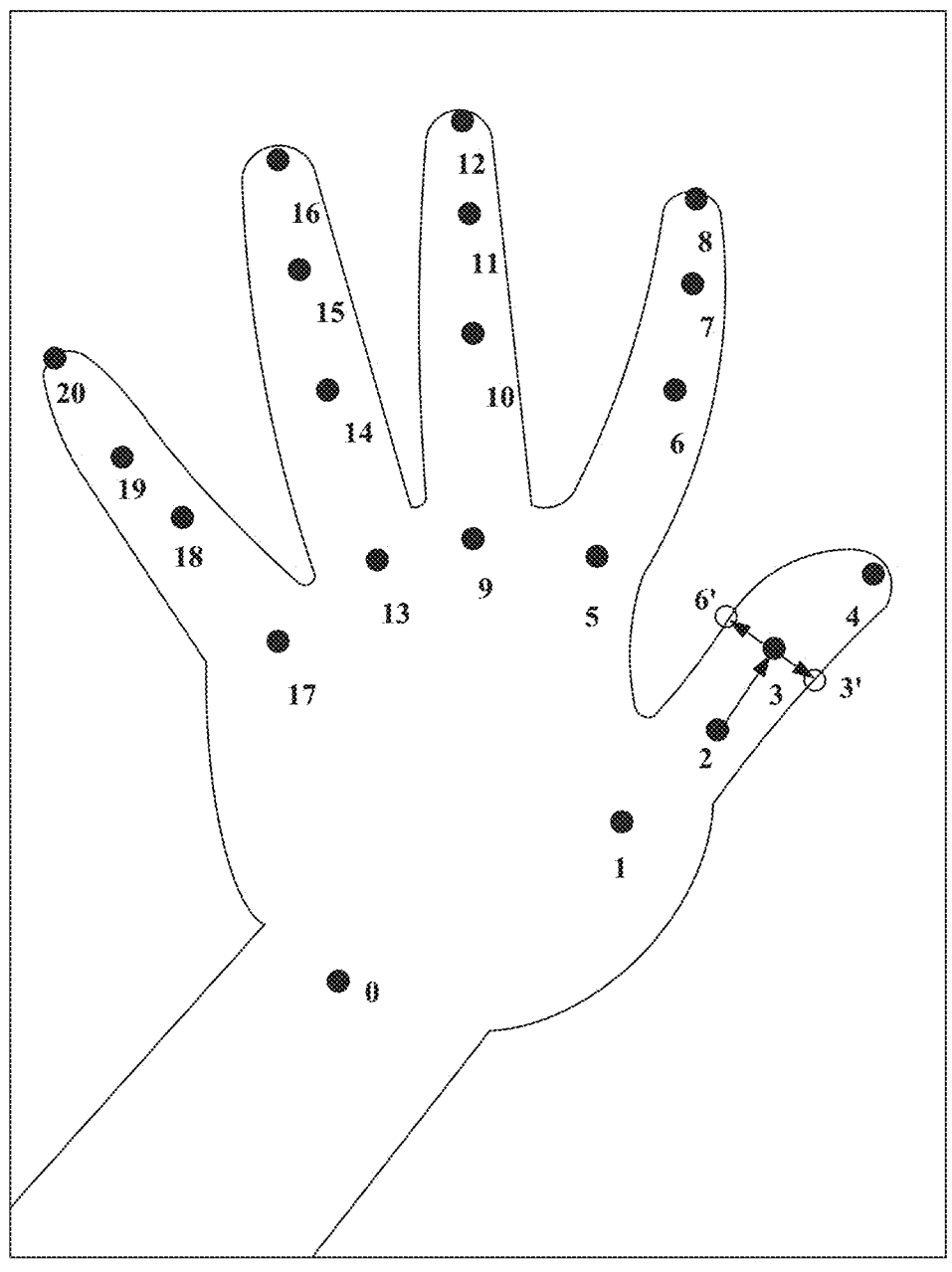
FIG. 8C is a schematic diagram of calculating coordinates of a finger contour edge according to an embodiment.

For vector AB generated by two palm bone points, on a normal vector of point A or point B, coordinates of a finger contour edge on the normal vector are obtained according to a relative coefficient. For example, referring to FIG. 8C, palm contour point 3' and palm contour point 6' are determined on a normal vector generated based on palm bone point 2 and palm bone point 3, and palm contour point 3' and palm contour point 6' are finger contour edge points.

A calculation process of the coordinates of the finger contour edge is as follows:

Start point coordinates of a palm bone point: (Xa, Ya); and end point coordinates of the palm bone point: (Xb, Yb)

Target point coordinates of a palm contour point: (X, Y)

If the target point is in a clockwise direction:

Target point coordinate X:

$$X = \frac{Ya - Yb}{\sqrt{(Xb - Xa)^2 + (Yb - Ya)^2}} * k + Xb$$

Target point coordinate Y:

$$Y = \frac{Xb - Xa}{\sqrt{(Xb - Xa)^2 + (Yb - Ya)^2}} * k + Yb$$

If the target point is in a counterclockwise direction:

Target point coordinate X:

$$X = \frac{Yb - Ya}{\sqrt{(Xb - Xa)^2 + (Yb - Ya)^2}} * k + Xb$$

Target point coordinate Y:

$$Y = \frac{Xa - Xb}{\sqrt{(Xb - Xa)^2 + (Yb - Ya)^2}} * k + Yb$$

Referring to FIG. 7B, palm contour point 2' to palm contour point 7', palm contour point 9' to palm contour point 14', palm contour point 16' to palm contour point 21', palm contour point 23' to palm contour point 28', and palm contour point 30' to palm contour point 35' are finger contour edge points.

k in the foregoing formula is a relative coefficient.

1-3. Generate a Palm Contour

Figure 8D:
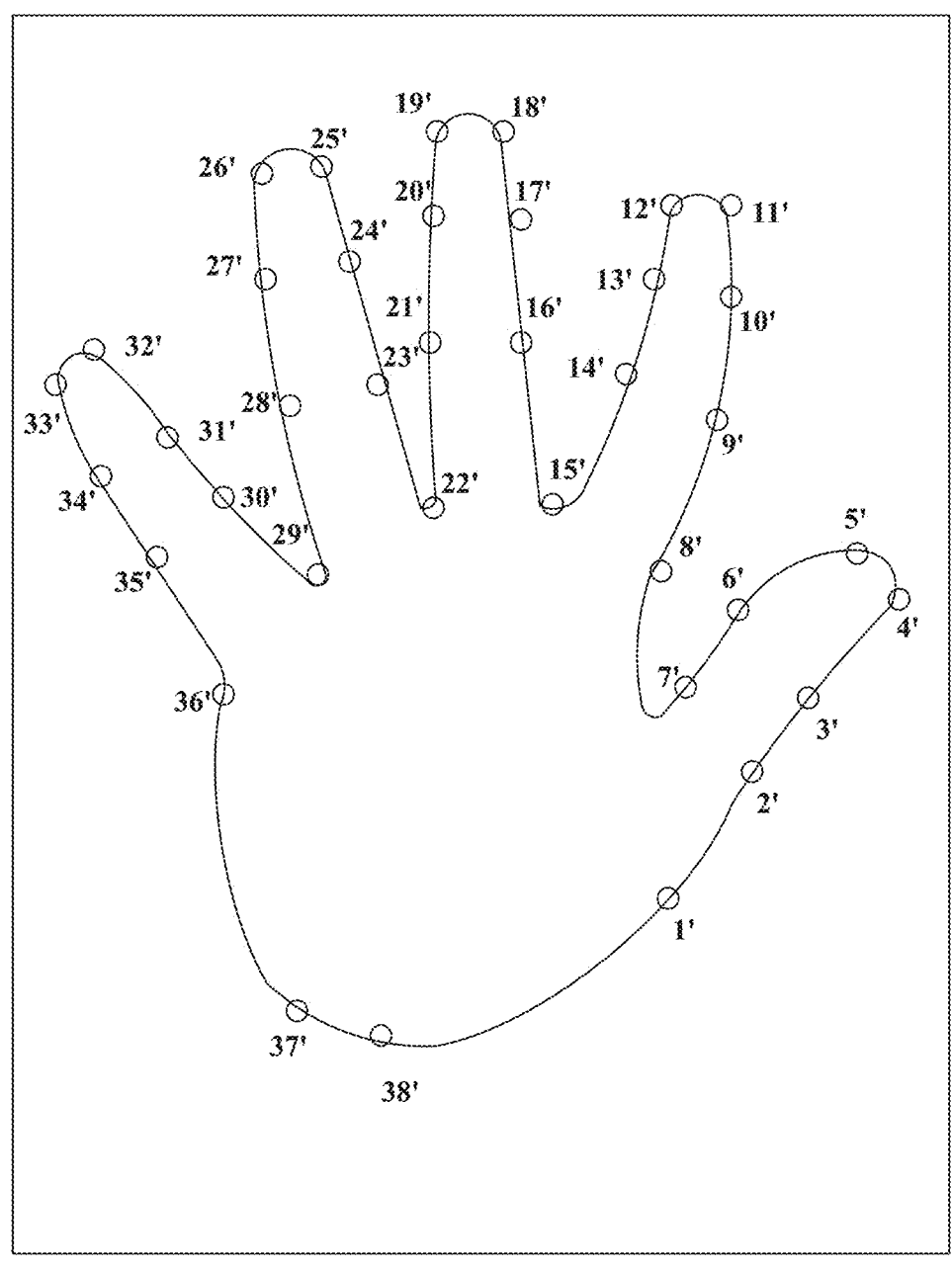
FIG. 8D is a schematic diagram of a palm contour according to an embodiment.

The palm contour points are connected to obtain a palm contour. FIG. 8D is a schematic diagram of a palm contour. Referring to FIG. 8D, 38 palm contour points are connected to obtain the palm contour.

2. Generate a Palm-Scanning Animation

In a palm-scanning payment scenario, after the palm contour is obtained, a palm-scanning animation may be generated based on the palm contour, to improve an interactive sense and a scientific sense brought to a user by palm-scanning payment.

Figure 9:
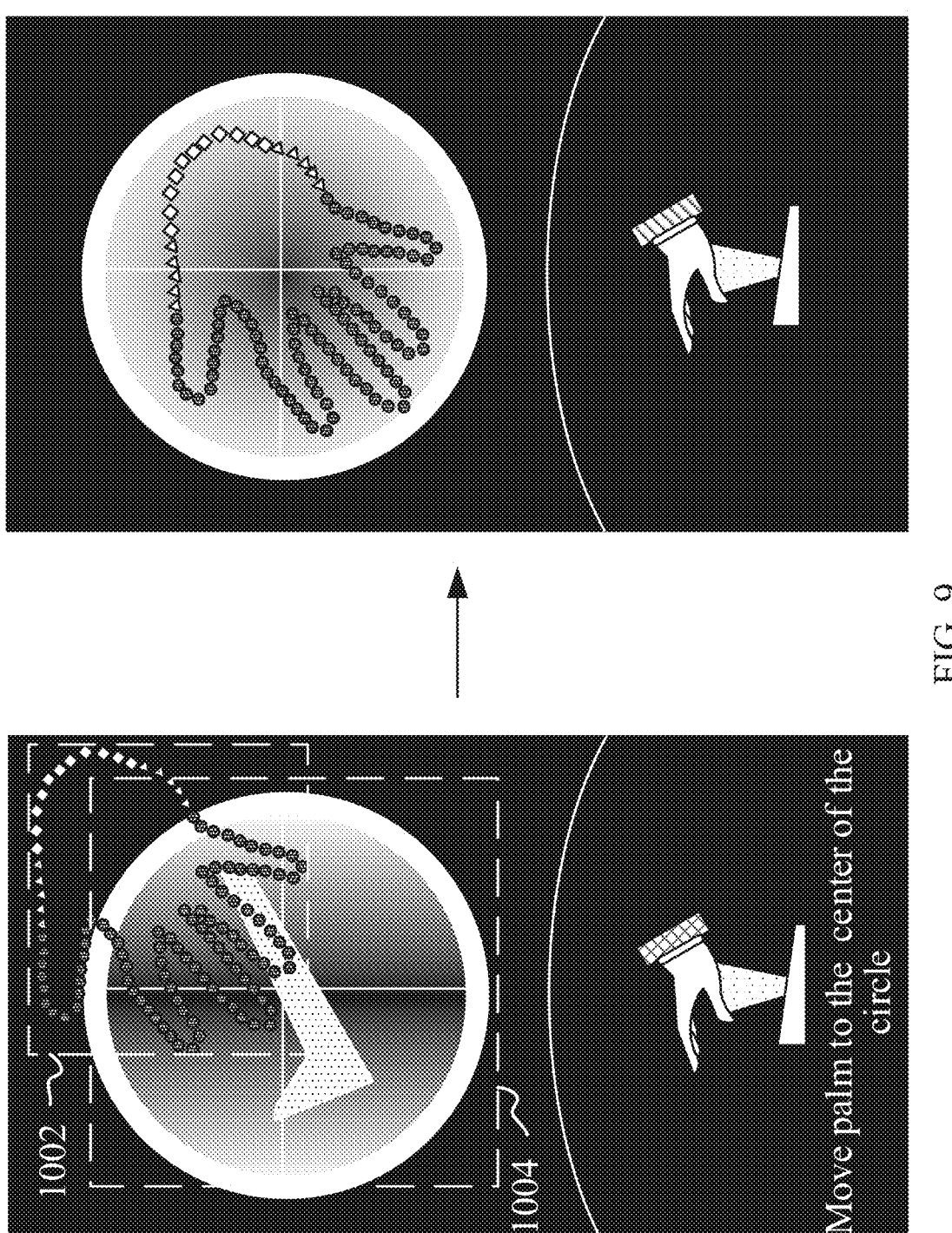
FIG. 9 is a schematic diagram of palm-scanning payment according to an embodiment.

Referring to FIG. 9, 1002 in FIG. 9 represents a palm contour displayed on a screen, and 1004 represents a target display position on the screen. If the palm contour is not displayed at the target display position, the user is prompted to move the palm to the target display position. If the palm contour is displayed at the target display position, a user identity is verified based on the palm image. After the verification succeeds, payment is performed.

In the foregoing embodiment, the palm contour point is determined based on the palm bone point, to generate the palm contour. The palm bone points are not susceptible to interference from image backgrounds, and extracting the palm contour from the image based on the palm bone points can ensure extraction accuracy of the palm contour. In addition, determining the palm contour points by using the geometric method can also ensure efficiency of data processing, ensure recognition performance, and improve the extraction efficiency of the palm contour.

Operations in flowcharts involved in the foregoing embodiments are displayed in sequence based on indication of arrows, but the operations are not necessarily performed in sequence based on a sequence indicated by the arrows. Unless indicated clearly, the operations do not need to be performed in a strict sequence, and can be performed in another sequence. In addition, at least some operations in the flowcharts involved in the foregoing embodiments may include a plurality of operations or a plurality of stages, and these operations or stages are not necessarily performed at the same moment, but may be performed at different moments. The operations or stages are not necessarily performed in sequence, but may be performed by turn or alternately with other operations or at least part of operations or stages in other operations.

Based on the same inventive concept, the embodiments of this application further provide a palm contour extraction apparatus configured to implement the foregoing palm contour extraction method, and further provides a control instruction generation apparatus configured to implement the foregoing control instruction generation method. An implementation solution to the problem provided by the apparatus is similar to the implementation solution described in the foregoing method. Therefore, for specific limitations in one or more embodiments of the palm contour extraction apparatus provided below, reference may be made to the foregoing limitations on the palm contour extraction method. For specific limitations in one or more embodiments of the control instruction generation apparatus provided below, reference may be made to the foregoing limitations on the control instruction generation method. Details are not described herein again.

Figure 10:
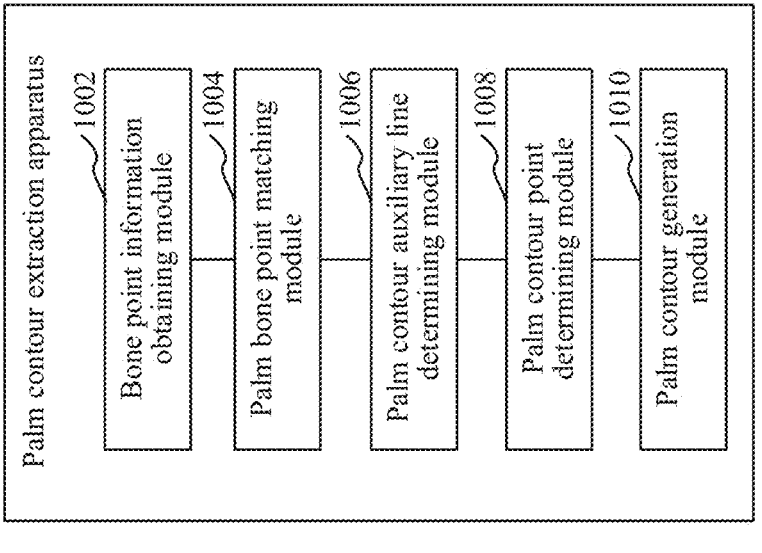
FIG. 10 is a structural block diagram of a palm contour extraction apparatus according to an embodiment.

In an embodiment, as shown in FIG. 10, a palm contour extraction apparatus is provided, including: a bone point information obtaining module 1002, a palm bone point matching module 1004, a palm contour auxiliary line determining module 1006, a palm contour point determining module 1008, and a palm contour generation module 1010.

The bone point information obtaining module 1002 is configured to obtain bone point information respectively corresponding to palm bone points in a target palm image, the bone point information including bone point positions and bone point types.

The palm bone point matching module 1004 is configured to match the palm bone points based on the bone point types, to obtain a plurality of palm bone point sets, each palm bone point set having a corresponding geometry processing type.

The palm contour auxiliary line determining module 1006 is configured to generate, based on the bone point positions corresponding to the bone points in the same palm bone point set, a palm contour auxiliary line matching the geometry processing type corresponding to the palm bone point set, to obtain palm contour auxiliary lines respectively corresponding to the palm bone point sets.

The palm contour point determining module 1008 is configured to determine, based on a reference step size corresponding to the same palm bone point set and the bone point positions, a palm contour point from the palm contour auxiliary line corresponding to the palm bone point set, to obtain a contour point position corresponding to the palm contour point.

The palm contour generation module 1010 is configured to generate a palm contour corresponding to the target palm image based on the contour point positions.

In the foregoing palm contour extraction apparatus, there is no need to perform complex data processing on pixel information of the palm image, and geometry processing is performed based on the bone point information corresponding to the palm bone points in the palm image, so that the contour point positions corresponding to the palm contour points can be conveniently determined from the palm image, to generate the palm contour based on the contour point positions corresponding to the palm contour points. Positions and types of the palm bone point are not susceptible to interference from image backgrounds. Extracting the palm contour based on the positions and the types of the palm bone points in the palm image can effectively improve extraction accuracy of the palm contour.

In an embodiment, the bone point type is determined by a finger parameter and an intra-finger joint parameter. The palm bone point matching module 1004 is further configured to: establish a matching relationship between adjacent palm bone points whose intra-finger joint parameter is a preset joint parameter, to obtain palm bone point sets corresponding to a first geometry processing type; establish a matching relationship between adjacent palm bone points corresponding to the same finger parameter, to obtain palm bone point sets corresponding to a second geometry processing type; and use palm bone points corresponding to a preset bone point type as preset bone points, and establish a matching relationship between the preset bone points and a palm bone point closest to the preset bone point, to obtain a palm bone point set corresponding to a third geometry processing type.

In an embodiment, the palm contour auxiliary line determining module 1006 is further configured to: determine a current auxiliary line type based on a geometry processing type corresponding to a current palm bone point set; generate a current bone point line segment corresponding to the current palm bone point set based on the bone point positions corresponding to the palm bone points in the current palm bone point set; and perform geometry processing on the current bone point line segment based on the current auxiliary line type, to obtain a palm contour auxiliary line corresponding to the current palm bone point set and belonging to the current auxiliary line type.

In an embodiment, the geometry processing type includes any one of a first geometry processing type, a second geometry processing type, or a third geometry processing type, an auxiliary line type corresponding to the first geometry processing type includes at least one of a mid-perpendicular line type or an extension line type, an auxiliary line type corresponding to the second geometry processing type includes a normal line type, and an auxiliary line type corresponding to the third geometry processing type includes at least one of a normal line type or an extension line type.

In an embodiment, the palm contour auxiliary line determining module 1006 is further configured to: when the current auxiliary line type is a mid-perpendicular line type, use a mid-perpendicular line corresponding to the current bone point line segment as the palm contour auxiliary line; when the current auxiliary line type is an extension line type, determine a target bone point from the palm bone points corresponding to the current palm bone point set, and use an extension line corresponding to the current bone point line segment and with the target bone point as a start point as the palm contour auxiliary line; and when the current auxiliary line type is a normal line type, determine the target bone point from the palm bone points corresponding to the current palm bone point set, and use a normal line of the current bone point line segment at the target bone point as the palm contour auxiliary line.

In an embodiment, the palm contour point determining module 1008 is further configured to: generate, based on the bone point positions corresponding to the bone points in a current palm bone point set, a current bone point line segment corresponding to the current palm bone point set; determine a reference point from the current bone point line segment; and move, with the reference point as a start point, the reference step size corresponding to the current palm bone point set on a current palm contour auxiliary line corresponding to the current palm bone point set according to a movement direction corresponding to the current palm contour auxiliary line, to obtain a current palm contour point and a contour point position corresponding to the current palm contour point.

In an embodiment, the current palm contour auxiliary line includes at least one of a mid-perpendicular line, an extension line, or a normal line, a movement direction corresponding to the mid-perpendicular line is a direction opposite to a palm, a movement direction corresponding to the extension line is an extension direction of the extension line, and a movement direction corresponding to the normal line is a vertical direction of the current bone point line segment.

In an embodiment, each palm bone point has a corresponding bone point identifier. The palm contour generation module 1010 is further configured to map the bone point identifiers corresponding to the palm bone points based on preset mapping information, to obtain contour point sorting identifiers corresponding to the palm contour points, where the preset mapping information includes an identifier mapping relationship between the palm bone points in the palm bone point set and the palm contour points generated based on the palm bone point set; and connect the contour point positions corresponding to the palm contour points in order according to the contour point sorting recognizers, to obtain the palm contour corresponding to the target palm image.

In an embodiment, the bone point information obtaining module 1002 is further configured to input the target palm image into a target palm bone point recognition model, to obtain the bone point information respectively corresponding to the palm bone points.

Referring to FIG. 11, the palm contour extraction apparatus further includes:

a model training module 1001, configured to: obtain a training data set, where the training data set includes a plurality of training palm images and training bone point information respectively corresponding to the training palm images; determine a current palm image from the training data set; input the current palm image into an initial palm bone point recognition model, to obtain predicted bone point information corresponding to the current palm image; adjust a model parameter corresponding to the initial palm bone point recognition model based on a difference between the predicted bone point information corresponding to the current palm image and the training bone point information, to obtain an intermediate bone point recognition model; and use a next training palm image as the current palm image, use the intermediate bone point recognition model as the initial palm bone point recognition model, and go back to perform the operation of inputting the current palm image into an initial palm bone point recognition model until a convergence condition is met, to obtain the target bone point recognition model.

In an embodiment, the palm contour is configured for generating a palm animation.

In an embodiment, as shown in FIG. 12, a control instruction generation apparatus is provided, including: a palm contour display module 1202 and a control instruction generation module 1204.

The palm contour display module 1202 is configured to display a palm contour determined based on a target palm image.

The control instruction generation module 1204 is configured to generate an object control instruction based on display information of the palm contour.

An extraction process of the palm contour includes the following operations: obtaining bone point information respectively corresponding to palm bone points in the target palm image, the bone point information including bone point positions and bone point types; matching the palm bone points based on the bone point types, to obtain a plurality of palm bone point sets, each palm bone point set having a corresponding geometry processing type; generating, based on the bone point positions corresponding to the bone points in the same palm bone point set, a palm contour auxiliary line matching the geometry processing type corresponding to the palm bone point set, to obtain palm contour auxiliary lines respectively corresponding to palm bone point sets; determining a palm contour point from the palm contour auxiliary line corresponding to the palm bone point set based on a reference step size corresponding to the same palm bone point set and the bone point positions, to obtain a contour point position corresponding to the palm contour point; and generating a palm contour corresponding to the target palm image based on the contour point positions.

In the foregoing control instruction generation apparatus, the contour point positions corresponding to the palm contour points are determined by performing geometry processing based on the bone point information corresponding to the palm bone points in the palm image, and the palm contour is generated based on the contour point positions corresponding to the palm contour points. The palm contour is extracted without the need to perform complex data processing on pixel information of the palm image, and has high extraction accuracy for being not susceptible to interference from image backgrounds. Extracting an accurate palm contour is also helpful to ensure accurate display, and further helpful to improve generation accuracy of the object control instruction. The object control instruction is automatically generated based on the display information of the palm contour, which can also improve the generation efficiency of the object control instruction.

In an embodiment, the control instruction generation module 1204 is further configured to: generate the object control instruction when a position difference between a display position of the palm contour and a target display position is less than a preset threshold; and generate palm movement prompt information based on the position difference when the position difference is greater than or equal to the preset threshold, where the palm movement prompt information is configured for prompting to move the palm to reduce the position difference.

In an embodiment, the target palm image is a palm image corresponding to a virtual resource transfer party, the object control instruction is a virtual resource transfer instruction, and the virtual resource transfer instruction is configured for instructing to transfer a virtual resource to a target account from a resource account corresponding to the virtual resource transfer party.

All or some of the modules in the foregoing palm contour extraction apparatus and control instruction generation apparatus may be implemented by software, hardware, and a combination thereof. The foregoing modules may be built in or independent of one or more processors of a computer device in a hardware form, or may be stored in a memory of the computer device in a software form, so that the one or more processors invoke and perform the operations corresponding to the foregoing modules.

In an embodiment, a computer device is provided. The computer device may be a server, and may have an internal structure diagram shown in FIG. 13. The computer device includes a processor, a memory, an input/output (I/O for short) interface, and a communication interface. The processor, the memory, and the input/output interface are connected through a system bus, and the communication interface is connected to the system bus through the input/output interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store data such as the target palm bone point recognition model, the reference step size, the preset mapping relationship, and the like. The input/output interface of the computer device is configured to exchange information between the processor and an external device. The communication interface of the computer device is configured to communicate with an external terminal through a network connection. The computer-readable instructions are executed by the processor to implement a palm contour extraction method or a control instruction generation method.

In an embodiment, a computer device is provided. The computer device may be a terminal, and may have an internal structure diagram shown in FIG. 14. The computer device includes a processor, a memory, an input/output interface, a communication interface, a display unit, and an input apparatus. The processor, the memory, and the input/output interface are connected through a system bus, and the communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The input/output interface of the computer device is configured to exchange information between the processor and an external device. The communication interface of the computer device is configured to communicate with an external terminal in a wired or a wireless manner, and the wireless manner may be implemented by using WIFI, a mobile cellular network, NFC (near field communication), or other technologies. The computer-readable instructions are executed by the processor to implement a palm contour extraction method or a control instruction generation method. The display unit of the computer device is configured to form a visible picture, and may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 13:
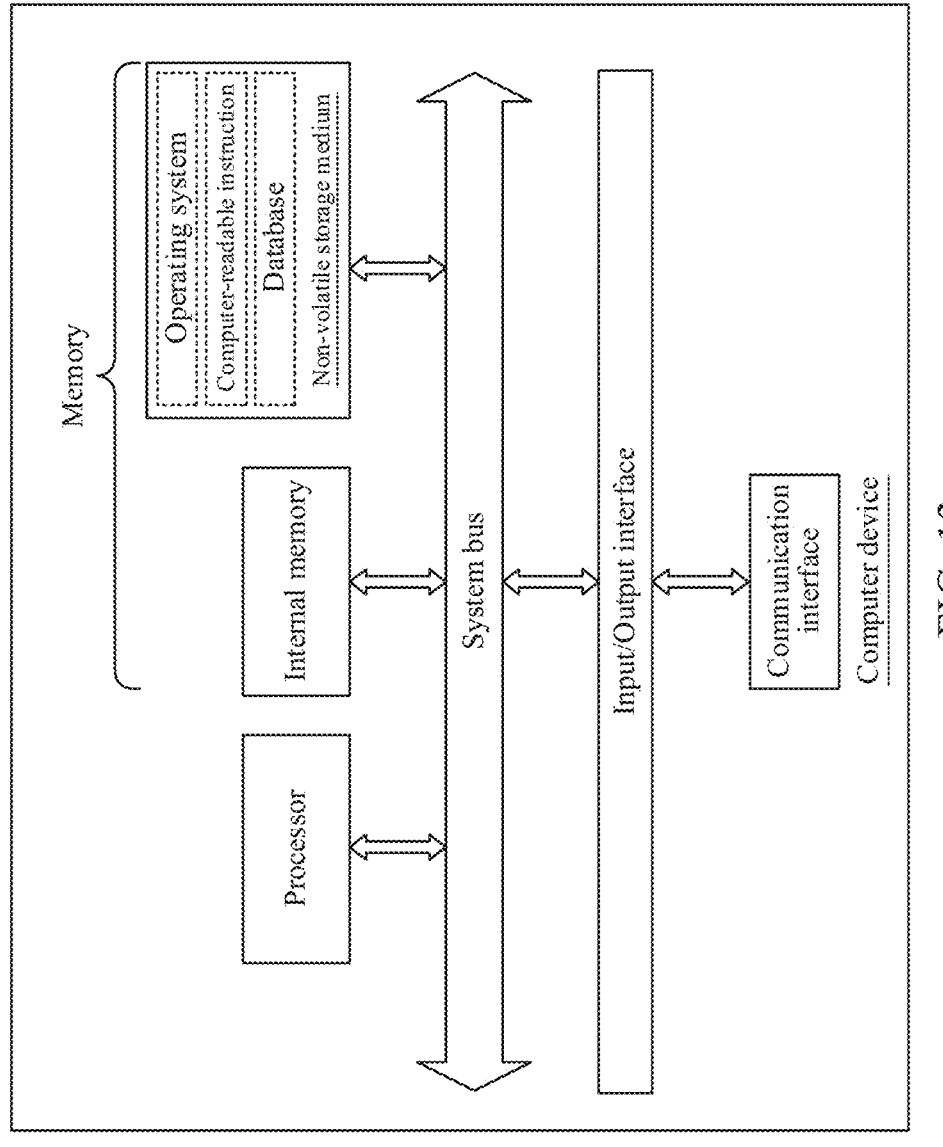
FIG. 13 is an internal structure diagram of a computer device according to an embodiment.
Figure 14:
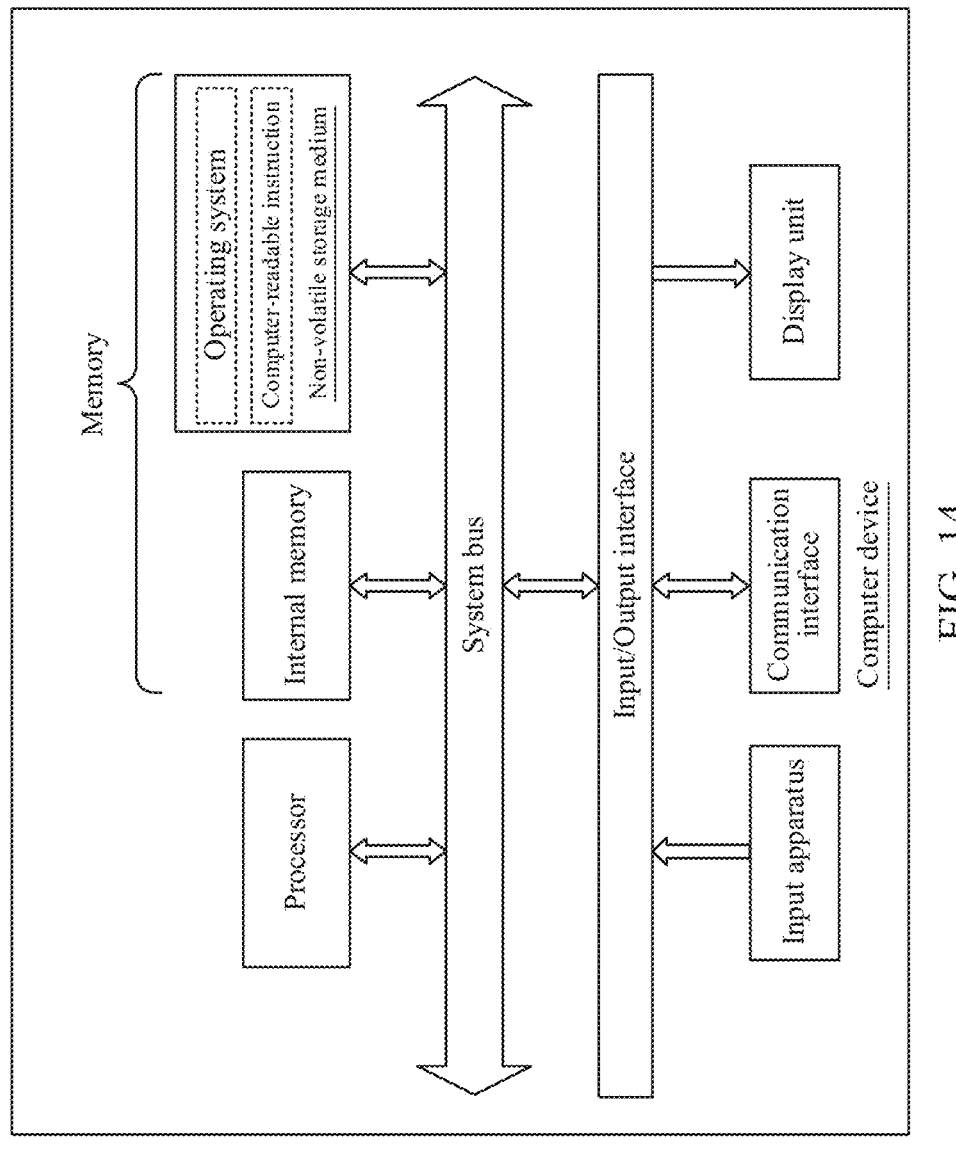
FIG. 14 is an internal structure diagram of a computer device according to another embodiment.

A person skilled in the art may understand that, the structure shown in FIG. 13 and FIG. 14 is merely a block diagram of a part of a structure related to the solutions of this application and does not limit the computer device to which the solutions of this application are applied. Specifically, the computer device may include more or fewer components than those in the drawings, or some components are combined, or a different component deployment is used.

In an embodiment, a computer device is provided, including a memory and one or more processors, the memory having computer-readable instructions stored therein, the computer-readable instructions, when executed by the one or more processors, implementing the operations in the foregoing method embodiments.

In an embodiment, a non-transitory computer-readable storage medium is provided, having computer-readable instructions stored therein, the computer-readable instructions, when executed by one or more processors, implementing the operations in the foregoing method embodiments.

A computer program product includes computer-readable instructions, the computer-readable instructions, when executed by one or more processors, implementing the operations of the foregoing method embodiments.

The user information (including, but not limited to, user equipment information, user personal information, and the like), data (including, but not limited to, data for analysis, stored data, displayed data, and the like), involved in this application all are information and data that are authorized by the user or fully authorized by each party, and the collection, use, and processing of relevant data need to comply with relevant laws and regulations of relevant countries and regions.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache. For the purpose of description instead of limitation, the RAM is available in a plurality of forms, such as a static random access memory (SRAM) or a dynamic random access memory (DRAM). The database involved in the embodiments provided in this application may include at least one of a relational database and a non-relational database. The non-relational database may include a blockchain-based distributed database, but is not limited thereto. The processor involved in the embodiments provided in this application may be a general-purpose processor, a central processing unit, a graphics processing unit, a digital signal processor, a programmable logic device, a quantum computing-based data processing logic device, and are not limited thereto.

The technical features in the foregoing embodiments may be combined in different manners from other embodiments. For concise description, not all possible combinations of the technical features in the foregoing embodiments are described. However, as long as combinations of the technical features do not conflict with each other, the combinations of the technical features are considered as falling within the scope described in this specification.

The foregoing embodiments only show several implementations of this application and are described in detail, but are not construed as a limitation to the scope of the patent application. A person of ordinary skill in the art can further make several variations and improvements without departing from the idea of this application, and the variations and improvements all fall within the protection scope of this application. Therefore, the protection scope of this application is subject to the protection scope of the appended claims. In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A palm contour extraction method performed by a computer device, the method comprising:

collecting a still palm image of a user as a target palm image;

obtaining bone point information respectively corresponding to palm bone points in the target palm image, the bone point information comprising bone point positions and bone point types;

matching the palm bone points based on the bone point positions and the bone point types, to obtain a plurality of palm bone point sets, each palm bone point set having a corresponding geometry processing type for a corresponding set of palm bone points in the target palm image;

determining a plurality of palm contour points from the plurality of palm bone point sets based on their respective geometry processing type;

generating a palm contour corresponding to the target palm image based on the plurality of palm contour points;

performing identity verification of the user based on the target palm image when a position difference between a display position of the palm contour and a target display position is less than a preset threshold; and generating palm movement prompt information to the user when the position difference is greater than or equal to the preset threshold.

2. The method according to claim 1, wherein the bone point type is determined by a finger parameter and an intra-finger joint parameter, and the matching the palm bone points based on the bone point positions and the bone point types, to obtain a plurality of palm bone point sets comprises:

establishing a matching relationship between adjacent palm bone points whose intra-finger joint parameter is a preset joint parameter, to obtain palm bone point sets corresponding to a first geometry processing type;

establishing a matching relationship between adjacent palm bone points corresponding to the same finger parameter, to obtain palm bone point sets corresponding to a second geometry processing type; and using a palm bone point corresponding to a preset bone point type as a preset bone point, and establishing a matching relationship between the preset bone point and a palm bone point closest to the preset bone point, to obtain a palm bone point set corresponding to a third geometry processing type.

3. The method according to claim 1, wherein the determining a plurality of palm contour points from the plurality of palm bone point sets based on their respective geometry processing type further comprises:

generating, based on the bone point positions corresponding to the bone points in each palm bone point set, a palm contour auxiliary line matching the geometry processing type of the palm bone point set, to obtain palm contour auxiliary lines respectively corresponding to the palm bone point sets; and determining one or more palm contour points from each palm bone point set based on a reference step size corresponding to the palm bone point set.

4. The method according to claim 3, wherein the generating, based on the bone point positions corresponding to the bone points in each palm bone point set, a palm contour auxiliary line matching the geometry processing type of the palm bone point set, to obtain palm contour auxiliary lines respectively corresponding to the palm bone point sets comprises:

determining a current auxiliary line type based on a geometry processing type corresponding to a current palm bone point set;

generating a current bone point line segment corresponding to the current palm bone point set based on the bone point positions corresponding to the palm bone points in the current palm bone point set; and performing geometry processing on the current bone point line segment based on the current auxiliary line type, to obtain a palm contour auxiliary line corresponding to the current palm bone point set and belonging to the current auxiliary line type.

5. The method according to claim 3, wherein the reference step size updates in accordance with palm size information corresponding to the target palm image.

6. The method according to claim 1, further comprising:

generating a palm animation in accordance with a movement of the palm contour corresponding to the target palm image.

7. The method according to claim 1, wherein the determining one or more palm contour points from each palm bone point set based on a reference step size corresponding to the palm bone point set comprises:

generating, based on the bone point positions corresponding to the bone points in a current palm bone point set, a current bone point line segment corresponding to the current palm bone point set;

determining a reference point from the current bone point line segment; and moving, with the reference point as a start point, the reference step size corresponding to the current palm bone point set on a current palm contour auxiliary line corresponding to the current palm bone point set according to a movement direction corresponding to the current palm contour auxiliary line, to obtain a current palm contour point and a contour point position corresponding to the current palm contour point.

8. The method according to claim 1, wherein each palm bone point has a corresponding bone point identifier, and the generating a palm contour corresponding to the target palm image based on the plurality of palm contour points comprises:

mapping the bone point identifiers corresponding to the palm bone points based on preset mapping information, to obtain contour point sorting identifiers corresponding to the palm contour points, wherein the preset mapping information comprises an identifier mapping relationship between the palm bone points in a palm bone point set and the palm contour points generated based on the palm bone point set; and connecting the palm contour points in an order according to the contour point sorting recognizers, to obtain the palm contour corresponding to the target palm image.

9. A computer device, comprising a memory and one or more processors, the memory having computer-readable instructions stored therein, and the computer-readable instructions, when executed by the one or more processors, causing the computer device to perform a palm contour extraction method including:

collecting a still palm image of a user as a target palm image;

obtaining bone point information respectively corresponding to palm bone points in the target palm image, the bone point information comprising bone point positions and bone point types;

matching the palm bone points based on the bone point positions and the bone point types, to obtain a plurality of palm bone point sets, each palm bone point set having a corresponding geometry processing type for a corresponding set of palm bone points in the target palm image;

determining a plurality of palm contour points from the plurality of palm bone point sets based on their respective geometry processing type;

generating a palm contour corresponding to the target palm image based on the plurality of palm contour points;

performing identity verification of the user based on the target palm image when a position difference between a display position of the palm contour and a target display position is less than a preset threshold; and generating palm movement prompt information to the user when the position difference is greater than or equal to the preset threshold.

10. The computer device according to claim 9, wherein the bone point type is determined by a finger parameter and an intra-finger joint parameter, and the matching the palm bone points based on the bone point positions and the bone point types, to obtain a plurality of palm bone point sets comprises:

establishing a matching relationship between adjacent palm bone points whose intra-finger joint parameter is a preset joint parameter, to obtain palm bone point sets corresponding to a first geometry processing type;

establishing a matching relationship between adjacent palm bone points corresponding to the same finger parameter, to obtain palm bone point sets corresponding to a second geometry processing type; and using a palm bone point corresponding to a preset bone point type as a preset bone point, and establishing a matching relationship between the preset bone point and a palm bone point closest to the preset bone point, to obtain a palm bone point set corresponding to a third geometry processing type.

11. The computer device according to claim 9, wherein the determining a plurality of palm contour points from the plurality of palm bone point sets based on their respective geometry processing type further comprises:

generating, based on the bone point positions corresponding to the bone points in each palm bone point set, a palm contour auxiliary line matching the geometry processing type of the palm bone point set, to obtain palm contour auxiliary lines respectively corresponding to the palm bone point sets; and determining one or more palm contour points from each palm bone point set based on a reference step size corresponding to the palm bone point set.

12. The computer device according to claim 11, wherein the generating, based on the bone point positions corresponding to the bone points in each palm bone point set, a palm contour auxiliary line matching the geometry processing type of the palm bone point set, to obtain palm contour auxiliary lines respectively corresponding to the palm bone point sets comprises:

determining a current auxiliary line type based on a geometry processing type corresponding to a current palm bone point set;

generating a current bone point line segment corresponding to the current palm bone point set based on the bone point positions corresponding to the palm bone points in the current palm bone point set; and performing geometry processing on the current bone point line segment based on the current auxiliary line type, to obtain a palm contour auxiliary line corresponding to the current palm bone point set and belonging to the current auxiliary line type.

13. The computer device according to claim 11, wherein the reference step size updates in accordance with palm size information corresponding to the target palm image.

14. The computer device according to claim 9, wherein the method further comprises:

generating a palm animation in accordance with a movement of the palm contour corresponding to the target palm image.

15. The computer device according to claim 9, wherein the determining one or more palm contour points from each palm bone point set based on a reference step size corresponding to the palm bone point set comprises:

generating, based on the bone point positions corresponding to the bone points in a current palm bone point set, a current bone point line segment corresponding to the current palm bone point set;

determining a reference point from the current bone point line segment; and moving, with the reference point as a start point, the reference step size corresponding to the current palm bone point set on a current palm contour auxiliary line corresponding to the current palm bone point set according to a movement direction corresponding to the current palm contour auxiliary line, to obtain a current palm contour point and a contour point position corresponding to the current palm contour point.

16. The computer device according to claim 9, wherein each palm bone point has a corresponding bone point identifier, and the generating a palm contour corresponding to the target palm image based on the plurality of palm contour points comprises:

mapping the bone point identifiers corresponding to the palm bone points based on preset mapping information, to obtain contour point sorting identifiers corresponding to the palm contour points, wherein the preset mapping information comprises an identifier mapping relationship between the palm bone points in a palm bone point set and the palm contour points generated based on the palm bone point set; and connecting the palm contour points in an order according to the contour point sorting recognizers, to obtain the palm contour corresponding to the target palm image.

17. A non-transitory computer-readable storage medium, having computer-readable instructions stored therein, the computer-readable instructions, when executed by one or more processors of a computer device, causing the computer device to perform a palm contour extraction method including:

collecting a still palm image of a user as a target palm image;

obtaining bone point information respectively corresponding to palm bone points in the target palm image, the bone point information comprising bone point positions and bone point types;

matching the palm bone points based on the bone point positions and the bone point types, to obtain a plurality of palm bone point sets, each palm bone point set having a corresponding geometry processing type for a corresponding set of palm bone points in the target palm image;

determining a plurality of palm contour points from the plurality of palm bone point sets based on their respective geometry processing type;

generating a palm contour corresponding to the target palm image based on the plurality of palm contour points;

performing identity verification of the user based on the target palm image when a position difference between a display position of the palm contour and a target display position is less than a preset threshold; and generating palm movement prompt information to the user when the position difference is greater than or equal to the preset threshold.

18. The non-transitory computer-readable storage medium according to claim 17, wherein the method further comprises:

generating a palm animation in accordance with a movement of the palm contour corresponding to the target palm image.

19. The non-transitory computer-readable storage medium according to claim 17, wherein the determining one or more palm contour points from each palm bone point set based on a reference step size corresponding to the palm bone point set comprises:

generating, based on the bone point positions corresponding to the bone points in a current palm bone point set, a current bone point line segment corresponding to the current palm bone point set;

determining a reference point from the current bone point line segment; and moving, with the reference point as a start point, the reference step size corresponding to the current palm bone point set on a current palm contour auxiliary line corresponding to the current palm bone point set according to a movement direction corresponding to the current palm contour auxiliary line, to obtain a current palm contour point and a contour point position corresponding to the current palm contour point.

20. The non-transitory computer-readable storage medium according to claim 17, wherein each palm bone point has a corresponding bone point identifier, and the generating a palm contour corresponding to the target palm image based on the plurality of palm contour points comprises:

mapping the bone point identifiers corresponding to the palm bone points based on preset mapping information, to obtain contour point sorting identifiers corresponding to the palm contour points, wherein the preset mapping information comprises an identifier mapping relationship between the palm bone points in a palm bone point set and the palm contour points generated based on the palm bone point set; and connecting the palm contour points in an order according to the contour point sorting recognizers, to obtain the palm contour corresponding to the target palm image.

* * * * *